(12) United States Patent
Wiker et al.

(10) Patent No.: US 10,036,558 B2
(45) Date of Patent: Jul. 31, 2018

(54) SELF-CLEANING OVEN

(71) Applicant: The Middleby Corporation, Elgin, IL (US)

(72) Inventors: John H. Wiker, Lockport, IL (US); Frank Carbonara, Mount Juliet, TN (US); Gregory J. Tomko, Elgin, IL (US); Michael R. Matthews, Jr., Crystal Lake, IL (US); Theodore James Chmiola, Roscoe, IL (US)

(73) Assignee: The Middleby Corporation, Elgin, IL (US)

( * ) Notice: Subject to any disclaimer, the term of this patent is extended or adjusted under 35 U.S.C. 154(b) by 0 days.

(21) Appl. No.: 13/793,679

(22) Filed: Mar. 11, 2013

(65) Prior Publication Data

US 2013/0186387 A1    Jul. 25, 2013

Related U.S. Application Data

(63) Continuation of application No. 13/612,522, filed on Sep. 12, 2012, and a continuation of application No.
(Continued)

(51) Int. Cl.
*F24C 15/32* (2006.01)
*A21B 1/24* (2006.01)
(Continued)

(52) U.S. Cl.
CPC ............ *F24C 15/322* (2013.01); *A21B 1/245* (2013.01); *F24C 3/122* (2013.01); *F24C 14/00* (2013.01); *F24C 14/02* (2013.01); *F24C 14/025* (2013.01)

(58) Field of Classification Search
CPC ........ F24C 15/322; F24C 7/085; F24C 13/00; F24C 15/325; F24C 15/327; F24C 7/006;
(Continued)

(56) References Cited

U.S. PATENT DOCUMENTS

| 1,294,999 A | 2/1919 | Brickman |
| 1,536,538 A | 5/1925 | Stouffer |

(Continued)

FOREIGN PATENT DOCUMENTS

| AU | 2098970 | 6/1971 |
| DE | 3536008 | 4/1987 |

(Continued)

OTHER PUBLICATIONS

Bakers Pride Oven Company, Inc., APC-18 Electric Conveyor Oven (Jul. 2000) 2 pages.

(Continued)

*Primary Examiner* — Jason Lau
(74) *Attorney, Agent, or Firm* — Michael Best & Friedrich LLP

(57) ABSTRACT

A conveyor oven having a first mode of operation and a second mode of operation is provided. The conveyor oven generally includes an oven chamber in which food is cooked, a conveyor movable to convey the food through the oven chamber, a burner to generate heat for the oven chamber, at least one blower to circulate air within the oven chamber, and a controller. The burner has a combustion airflow rate, and operates at a first output during the first mode of operation and at a second output that is greater than the first output during the second mode of operation. The blower operates at a first speed during the first mode of operation and at a second speed that is faster than the first speed during the second mode of operation. The controller is responsive to at least one of a burner output and an internal temperature of the oven chamber, and increases the speed of the blower from the first speed during the first mode of operation to the second speed during the second mode of operation responsive to at least one of an increase of the (Continued)

burner output and an increase of the internal temperature of the oven chamber.

20 Claims, 16 Drawing Sheets

Related U.S. Application Data

12/463,051, filed on May 8, 2009, now Pat. No. 8,413,646, said application No. 13/612,522 is a continuation of application No. 12/463,051, filed on May 8, 2009, now Pat. No. 8,413,646, which is a continuation of application No. 10/546,104, filed as application No. PCT/US2004/005153 on Feb. 20, 2004.

(60) Provisional application No. 60/449,545, filed on Feb. 21, 2003.

(51) Int. Cl.
 *F24C 14/02* (2006.01)
 *F24C 3/12* (2006.01)
 *F24C 14/00* (2006.01)

(58) Field of Classification Search
 CPC ........ F24C 15/162; F24C 15/34; F24C 3/128; F24C 7/087; A47J 39/003; A21B 1/245; A21B 1/48; A21B 1/40; F27D 9/00
 USPC .................................. 126/21 R, 21 A, 41 C
 See application file for complete search history.

(56) References Cited

U.S. PATENT DOCUMENTS

| | | | |
|---|---|---|---|
| 2,008,042 A | 7/1935 | Sackett | |
| 2,051,401 A | 8/1936 | Winterstein | |
| 2,088,505 A | 7/1937 | Brumbaugh | |
| 2,139,344 A | 12/1938 | Andersen | |
| 2,264,974 A * | 12/1941 | Hallinan | F16H 9/04 236/10 |
| 2,340,354 A | 2/1944 | Wells | |
| 2,360,608 A | 10/1944 | Kauffman et al. | |
| 2,506,403 A | 5/1950 | Witzel | |
| 2,604,150 A | 7/1952 | Taylor | |
| 2,625,992 A | 1/1953 | Vernon | |
| 2,733,759 A | 2/1953 | McCammant | |
| 2,655,096 A * | 10/1953 | Ebin | 99/420 |
| 2,667,605 A | 1/1954 | Massier | |
| 2,845,056 A | 7/1958 | Chambers | |
| 2,939,524 A | 6/1960 | Hillebrand et al. | |
| 3,154,004 A | 10/1964 | Huck | |
| 3,162,430 A | 12/1964 | Wilkerson | |
| 3,171,346 A | 3/1965 | Lannert et al. | |
| 3,173,357 A | 3/1965 | Nunnery | |
| 3,182,166 A | 5/1965 | Helmut et al. | |
| 3,266,442 A | 8/1966 | Udall et al. | |
| 3,294,011 A | 12/1966 | Brunson et al. | |
| 3,329,506 A | 7/1967 | Smith, Jr. | |
| 3,338,154 A | 8/1967 | Gomez | |
| 3,364,912 A | 1/1968 | Dills et al. | |
| 3,403,670 A * | 10/1968 | Mutchler | F24C 5/16 126/15 R |
| 3,413,443 A | 11/1968 | Britt | |
| 3,417,742 A | 12/1968 | Perl | |
| 3,440,975 A | 4/1969 | Beuker | |
| 3,448,678 A | 6/1969 | Burstein | |
| 3,469,567 A | 9/1969 | Bergquist | |
| 3,485,230 A | 12/1969 | Harrington et al. | |
| 3,486,694 A | 12/1969 | Henson | |
| 3,547,099 A | 12/1970 | McArthur, Jr. | |
| 3,570,391 A | 3/1971 | Rejler | |
| 3,580,164 A | 5/1971 | Baker | |
| 3,586,825 A | 6/1971 | Hurley | |
| 3,589,848 A | 6/1971 | Potts | |
| 3,617,159 A | 11/1971 | Arndt | |
| 3,646,880 A | 3/1972 | Norris | |
| 3,694,137 A | 9/1972 | Fichter et al. | |
| 3,721,805 A | 3/1973 | Barratt | |
| 3,749,546 A | 7/1973 | Goodnight et al. | |
| 3,749,548 A | 7/1973 | Zink | |
| 3,799,730 A | 3/1974 | Das et al. | |
| 3,857,669 A | 12/1974 | Smith et al. | |
| 3,861,854 A | 1/1975 | Walbridge | |
| 3,884,213 A | 5/1975 | Smith | |
| 3,894,832 A | 7/1975 | Chin et al. | |
| 3,941,553 A | 3/1976 | Bedford | |
| 3,943,910 A | 3/1976 | White | |
| 3,993,788 A | 11/1976 | Longenecker | |
| 4,020,821 A | 5/1977 | Reid, Jr. et al. | |
| 4,034,663 A | 7/1977 | Jenn et al. | |
| 4,039,275 A | 8/1977 | McGettrick | |
| 4,055,677 A | 10/1977 | White | |
| 4,057,670 A | 11/1977 | Scheidler | |
| 4,088,436 A | 5/1978 | Alferes | |
| 4,089,258 A | 5/1978 | Berger | |
| 4,131,412 A | 12/1978 | Matthews | |
| 4,154,861 A | 5/1979 | Smith | |
| 4,176,589 A | 12/1979 | Stuck | |
| 4,188,868 A | 2/1980 | Baker et al. | |
| 4,189,680 A | 2/1980 | Clark | |
| 4,195,558 A | 4/1980 | Speakman | |
| 4,201,924 A | 5/1980 | Uram | |
| 4,204,830 A | 5/1980 | Jones et al. | |
| 4,228,730 A | 10/1980 | Schnidler et al. | |
| 4,229,157 A | 10/1980 | Ito et al. | |
| 4,242,079 A | 12/1980 | Matthews | |
| 4,245,978 A | 1/1981 | del Valle | |
| 4,252,300 A | 2/1981 | Herder | |
| 4,281,358 A | 7/1981 | Plouffe et al. | |
| 4,297,942 A | 11/1981 | Benson et al. | |
| 4,321,857 A | 3/1982 | Best | |
| 4,332,189 A | 6/1982 | Stuck | |
| 4,337,893 A | 7/1982 | Flanders et al. | |
| 4,359,315 A | 11/1982 | Matthews | |
| 4,366,177 A | 12/1982 | Wells et al. | |
| 4,377,109 A | 3/1983 | Brown et al. | |
| 4,389,562 A | 6/1983 | Chaudoir | |
| 4,403,942 A | 9/1983 | Copenhaver | |
| 4,421,015 A | 12/1983 | Masters et al. | |
| 4,438,572 A | 3/1984 | Kaminski | |
| 4,446,358 A | 5/1984 | Comerford et al. | |
| 4,457,291 A | 7/1984 | Henke | |
| 4,462,383 A | 7/1984 | Henke et al. | |
| 4,474,498 A | 10/1984 | Smith | |
| 4,479,776 A | 10/1984 | Smith | |
| 4,492,839 A | 1/1985 | Smith | |
| 4,499,368 A | 2/1985 | Payne | |
| 4,508,025 A | 4/1985 | Schultz | |
| 4,516,012 A | 5/1985 | Smith et al. | |
| 4,517,447 A | 5/1985 | Hicks | |
| 4,519,771 A | 5/1985 | Six et al. | |
| 4,554,437 A | 11/1985 | Wagner et al. | |
| 4,569,658 A | 2/1986 | Wiggins et al. | |
| 4,576,090 A | 3/1986 | Burtea | |
| 4,601,743 A | 7/1986 | Canfield | |
| 4,610,886 A | 9/1986 | Buller-Colthurst | |
| 4,614,491 A | 9/1986 | Welden | |
| 4,615,014 A | 9/1986 | Gigandet et al. | |
| 4,615,282 A | 10/1986 | Brown | |
| 4,626,661 A | 12/1986 | Henke | |
| 4,662,838 A | 5/1987 | Riordan | |
| 4,671,250 A | 6/1987 | Hurley et al. | |
| 4,676,151 A | 6/1987 | Gorsuch et al. | |
| 4,681,084 A | 7/1987 | Grech | |
| 4,700,685 A | 10/1987 | Miller | |
| 4,701,340 A | 10/1987 | Bratton et al. | |
| 4,716,820 A | 1/1988 | Stuck | |
| 4,730,100 A * | 3/1988 | Pingelton | A47J 39/003 219/386 |
| 4,739,154 A | 4/1988 | Bharara et al. | |
| 4,749,581 A | 6/1988 | Gorsuch et al. | |
| 4,750,276 A | 6/1988 | Smith et al. | |
| 4,753,215 A | 6/1988 | Kaminski et al. | |

(56) References Cited

U.S. PATENT DOCUMENTS

| | | | |
|---|---|---|---|
| 4,757,800 | A | 7/1988 | Shei et al. |
| 4,760,911 | A | 8/1988 | Bacigalupe et al. |
| 4,766,877 | A | 8/1988 | Jensen |
| 4,781,169 | A | 11/1988 | Henke et al. |
| 4,787,842 | A | 11/1988 | Stewart et al. |
| 4,792,303 | A | 12/1988 | Stewart et al. |
| 4,798,531 | A | 1/1989 | Breckner |
| 4,834,063 | A | 5/1989 | Hwang et al. |
| 4,835,351 | A | 5/1989 | Smith et al. |
| 4,846,143 | A | 7/1989 | Csadenyi |
| 4,846,647 | A | 7/1989 | Stewart et al. |
| 4,881,519 | A | 11/1989 | Henke |
| 4,882,981 | A | 11/1989 | Bacigalupe et al. |
| 4,884,552 | A | 12/1989 | Wells et al. |
| 4,886,044 | A | 12/1989 | Best |
| 4,887,959 | A | 12/1989 | Shellenberger |
| 4,922,861 | A | 5/1990 | Tsutsui et al. |
| 4,924,763 | A | 5/1990 | Bingham |
| 4,924,767 | A | 5/1990 | Stuck |
| 4,928,663 | A | 5/1990 | Nevin et al. |
| 4,936,286 | A | 6/1990 | Baker |
| 4,940,040 | A | 7/1990 | Randall et al. |
| 4,941,819 | A | 7/1990 | Stewart et al. |
| 4,951,648 | A | 8/1990 | Shukla et al. |
| 4,963,375 | A | 10/1990 | Sato et al. |
| 4,964,392 | A | 10/1990 | Bruno et al. |
| 4,977,111 | A | 12/1990 | Tong et al. |
| 4,981,416 | A | 1/1991 | Nevin et al. |
| 5,012,071 | A | 4/1991 | Henke |
| 5,013,563 | A | 5/1991 | Stuck |
| 5,016,606 | A | 5/1991 | Himmel et al. |
| 5,025,775 | A | 6/1991 | Crisp |
| 5,033,366 | A | 7/1991 | Sullivan |
| 5,045,658 | A | 9/1991 | Smith |
| 5,078,050 | A | 1/1992 | Smith |
| 5,112,630 | A | 5/1992 | Scott |
| 5,131,841 | A | 7/1992 | Smith et al. |
| 5,134,263 | A | 7/1992 | Smith et al. |
| 5,147,994 | A | 9/1992 | Smith et al. |
| 5,154,160 | A | 10/1992 | Burtea et al. |
| 5,161,889 | A | 11/1992 | Smith et al. |
| 5,161,965 | A | 11/1992 | Nakamura |
| 5,179,265 | A | 1/1993 | Sheridan et al. |
| 5,189,944 | A | 3/1993 | Rasmussen et al. |
| 5,197,375 | A | 3/1993 | Rosenbrock et al. |
| 5,205,274 | A | 4/1993 | Smith et al. |
| 5,206,045 | A | 4/1993 | Stuck |
| 5,210,387 | A | 5/1993 | Smith et al. |
| 5,224,856 | A | 7/1993 | Nakamura |
| 5,234,196 | A | 8/1993 | Harris |
| 5,249,739 | A | 10/1993 | Bartels et al. |
| 5,253,564 | A | 10/1993 | Rosenbrock et al. |
| 5,257,574 | A | 11/1993 | Hiromichi |
| 5,263,851 | A * | 11/1993 | Hosome ............ F23N 5/082 431/63 |
| 5,276,978 | A | 1/1994 | Hopkins et al. |
| 5,277,105 | A | 1/1994 | Bruno et al. |
| RE34,541 | E | 2/1994 | Kreiger |
| 5,289,500 | A | 2/1994 | Inou et al. |
| 5,310,978 | A | 5/1994 | Smith et al. |
| 5,321,229 | A | 6/1994 | Holling et al. |
| 5,351,416 | A | 10/1994 | Witkin |
| 5,361,749 | A | 11/1994 | Smith et al. |
| 5,365,918 | A | 11/1994 | Smith et al. |
| 5,368,476 | A | 11/1994 | Sugahara et al. |
| 5,379,752 | A | 1/1995 | Virgil, Jr. et al. |
| 5,398,666 | A | 3/1995 | Smith et al. |
| 5,401,940 | A | 3/1995 | Smith et al. |
| 5,404,808 | A | 4/1995 | Smith et al. |
| 5,431,181 | A | 7/1995 | Saadi et al. |
| 5,449,888 | A | 9/1995 | Smith et al. |
| 5,452,709 | A | 9/1995 | Mealer |
| 5,454,295 | A | 10/1995 | Cox et al. |
| 5,458,051 | A | 10/1995 | Alden et al. |
| 5,470,018 | A | 11/1995 | Smith |
| 5,471,972 | A * | 12/1995 | Corliss et al. ............ 126/21 A |
| 5,473,975 | A | 12/1995 | Bruno et al. |
| 5,492,055 | A | 2/1996 | Nevin et al. |
| 5,500,508 | A | 3/1996 | Gerl |
| 5,509,403 | A | 4/1996 | Kahlke et al. |
| 5,510,601 | A | 4/1996 | Smith et al. |
| 5,512,312 | A | 4/1996 | Forney et al. |
| 5,520,533 | A | 5/1996 | Vrolijk |
| 5,520,553 | A | 5/1996 | Cecil, Jr. et al. |
| 5,539,187 | A | 7/1996 | Smith et al. |
| 5,547,373 | A | 8/1996 | Snell |
| 5,558,010 | A | 9/1996 | Shelton |
| 5,560,952 | A | 10/1996 | Miller et al. |
| 5,568,802 | A | 10/1996 | Buday et al. |
| 5,582,758 | A | 12/1996 | Smith et al. |
| 5,588,354 | A | 12/1996 | Stuck et al. |
| 5,609,095 | A | 3/1997 | Lemke et al. |
| 5,630,408 | A | 5/1997 | Versluis |
| 5,640,896 | A | 6/1997 | Stuck |
| 5,655,511 | A | 8/1997 | Prabhu et al. |
| 5,671,660 | A | 9/1997 | Moshonas |
| 5,676,044 | A | 10/1997 | Lara, Jr. |
| 5,676,870 | A * | 10/1997 | Wassman ............ F24C 15/325 126/21 A |
| 5,686,004 | A | 11/1997 | Schneider |
| 5,704,278 | A | 1/1998 | Cross |
| 5,717,192 | A | 2/1998 | Dobie et al. |
| 5,724,244 | A | 3/1998 | Yabuki |
| 5,727,451 | A | 3/1998 | Demars |
| 5,786,566 | A | 7/1998 | Miller et al. |
| 5,795,145 | A | 8/1998 | Manning et al. |
| 5,818,014 | A | 10/1998 | Smith et al. |
| 5,819,721 | A | 10/1998 | Carr et al. |
| 5,821,503 | A | 10/1998 | Witt |
| 5,832,812 | A | 11/1998 | Wolfe et al. |
| 5,864,120 | A | 1/1999 | Vroom et al. |
| 5,869,810 | A | 2/1999 | Reynolds et al. |
| 5,875,705 | A | 3/1999 | Knost |
| 5,897,807 | A | 4/1999 | Edgar et al. |
| 5,906,485 | A | 5/1999 | Groff et al. |
| 5,919,039 | A | 7/1999 | Shaw et al. |
| 5,937,846 | A | 8/1999 | Martin et al. |
| 5,938,425 | A | 8/1999 | Damrath et al. |
| 5,938,961 | A | 8/1999 | Maher, Jr. |
| 5,941,236 | A | 8/1999 | Byrne |
| 5,942,142 | A | 8/1999 | Forney et al. |
| 5,958,274 | A | 9/1999 | Dobie et al. |
| 5,964,044 | A | 10/1999 | Lauersdorf et al. |
| 5,971,745 | A * | 10/1999 | Bassett ............... F23N 1/022 431/12 |
| 5,975,072 | A | 11/1999 | Garceau et al. |
| 5,997,924 | A | 12/1999 | Olander, Jr. et al. |
| 5,997,930 | A | 12/1999 | Kendall et al. |
| 6,000,933 | A | 12/1999 | Frederick, Sr. |
| 6,018,466 | A | 1/2000 | Lucian |
| 6,019,593 | A | 2/2000 | Lewandowski et al. |
| 6,023,051 | A | 2/2000 | Fellows |
| 6,026,036 | A | 2/2000 | Sekiya et al. |
| 6,037,580 | A | 3/2000 | Renk |
| 6,062,245 | A | 5/2000 | Berglind et al. |
| 6,080,972 | A | 6/2000 | May |
| 6,082,251 | A | 7/2000 | Kendall et al. |
| 6,091,055 | A | 7/2000 | Naka et al. |
| 6,114,666 | A | 9/2000 | Best |
| 6,116,895 | A | 9/2000 | Onuschak |
| 6,121,593 | A | 9/2000 | Mansbery et al. |
| 6,123,063 | A | 9/2000 | Boerjes |
| 6,131,559 | A * | 10/2000 | Norris ................ A21B 1/245 126/21 A |
| 6,140,619 | A | 10/2000 | Couch |
| 6,141,967 | A | 11/2000 | Angel et al. |
| 6,149,065 | A | 11/2000 | White et al. |
| 6,157,002 | A | 12/2000 | Schjerven, Sr. et al. |
| 6,157,014 | A | 12/2000 | Goranson |
| 6,171,630 | B1 | 1/2001 | Stanger et al. |
| 6,179,212 | B1 | 1/2001 | Banko |
| 6,216,683 | B1 | 4/2001 | Maughan |
| 6,217,312 | B1 | 4/2001 | Levinson et al. |
| 6,227,189 | B1 | 5/2001 | Dougherty |

(56) References Cited

U.S. PATENT DOCUMENTS

| | | | |
|---|---|---|---|
| 6,250,296 B1 | 6/2001 | Norris et al. |
| 6,252,201 B1 | 6/2001 | Nevarez |
| 6,369,360 B1 | 4/2002 | Cook |
| 6,389,960 B1 | 5/2002 | Williams et al. |
| 6,408,223 B1 | 6/2002 | Skyum et al. |
| 6,453,984 B1 | 9/2002 | Liebermann et al. |
| 6,462,319 B1 | 10/2002 | Uy et al. |
| 6,468,593 B1 | 10/2002 | Iizawa et al. |
| 6,481,433 B1 | 11/2002 | Schjerven, Sr. et al. |
| 6,481,999 B2 | 11/2002 | Knost |
| 6,520,296 B1 | 2/2003 | Bunker |
| 6,526,961 B1 | 3/2003 | Hardenburger |
| 6,539,934 B2* | 4/2003 | Moshonas et al. ........ 126/21 A |
| 6,552,309 B1 | 4/2003 | Kish et al. |
| 6,576,874 B2 | 6/2003 | Zapata et al. |
| 6,592,364 B2 | 7/2003 | Zapata et al. |
| 6,624,396 B2 | 9/2003 | Witt et al. |
| 6,630,650 B2 | 10/2003 | Bassill et al. |
| 6,638,553 B2 | 10/2003 | Bell et al. |
| 6,655,373 B1 | 12/2003 | Wiker |
| 6,684,657 B1 | 2/2004 | Dougherty |
| 6,684,875 B1 | 2/2004 | Schjerven, Sr. et al. |
| 6,707,014 B1 | 3/2004 | Corey et al. |
| 6,723,961 B2 | 4/2004 | Choat et al. |
| 6,730,890 B2 | 5/2004 | Kish et al. |
| 6,779,519 B2 | 8/2004 | Harneit |
| 6,799,712 B1 | 10/2004 | Austen et al. |
| 6,805,112 B2 | 10/2004 | Cole et al. |
| 6,810,794 B2 | 11/2004 | Murthy et al. |
| 6,817,283 B2 | 11/2004 | Jones et al. |
| 6,860,734 B2 | 3/2005 | Zia et al. |
| 6,872,919 B2* | 3/2005 | Wakefield ........... F24C 15/2014 219/400 |
| 6,904,903 B1 | 6/2005 | Vroom |
| 6,920,820 B2 | 7/2005 | Meggison et al. |
| 6,922,522 B2 | 7/2005 | Wang et al. |
| 6,933,473 B2 | 8/2005 | Henke et al. |
| 6,943,321 B2 | 9/2005 | Carbone et al. |
| 6,951,998 B2 | 10/2005 | Nanno et al. |
| 7,018,201 B1 | 3/2006 | Pierce et al. |
| 7,059,317 B2 | 6/2006 | Kobayashi |
| 7,091,452 B2 | 8/2006 | Kingdon et al. |
| 7,193,184 B1 | 3/2007 | Manning |
| 7,220,944 B2 | 3/2007 | Miller et al. |
| 7,255,100 B2 | 8/2007 | Repper et al. |
| RE39,828 E | 9/2007 | Miller et al. |
| 7,340,992 B1 | 3/2008 | Wolfe et al. |
| 7,360,533 B2 | 4/2008 | McFadden |
| 7,451,559 B2 | 11/2008 | Chen et al. |
| 7,494,337 B2 | 2/2009 | Specht et al. |
| 7,507,938 B2 | 3/2009 | McFadden |
| 7,513,247 B2 | 4/2009 | Clauss et al. |
| 7,541,559 B2 | 6/2009 | Milz |
| 7,686,008 B2 | 3/2010 | Willett |
| 7,800,023 B2 | 9/2010 | Burtea et al. |
| 7,836,874 B2 | 11/2010 | McFadden |
| 7,836,875 B2 | 11/2010 | McFadden et al. |
| 7,851,727 B2 | 12/2010 | Burtea et al. |
| 7,886,658 B2 | 2/2011 | McFadden et al. |
| 7,946,224 B2 | 5/2011 | McFadden |
| 8,006,685 B2 | 8/2011 | Bolton et al. |
| 8,011,293 B2 | 9/2011 | McFadden et al. |
| 8,035,062 B2 | 10/2011 | McFadden et al. |
| 8,042,533 B2 | 10/2011 | Dobie et al. |
| RE43,035 E* | 12/2011 | Schjerven, Sr. ....... A21B 1/245 126/116 A |
| 8,087,407 B2 | 1/2012 | Wiker et al. |
| 8,093,533 B2 | 1/2012 | French et al. |
| 8,113,190 B2 | 2/2012 | Dougherty |
| 8,206,147 B2 | 6/2012 | Videto et al. |
| 8,206,148 B2 | 6/2012 | Paesani |
| 8,210,844 B2 | 7/2012 | Wolfe et al. |
| 8,267,051 B2 | 9/2012 | Ando |
| 8,281,779 B2 | 10/2012 | Wiker et al. |
| 8,297,270 B2 | 10/2012 | McFadden |
| 8,371,285 B2 | 2/2013 | Wiker et al. |
| 8,418,661 B2 | 4/2013 | Kanda et al. |
| 8,536,493 B1 | 9/2013 | Wolfe |
| 8,563,059 B2 | 10/2013 | Luckhardt et al. |
| 8,757,203 B2 | 6/2014 | Cadeau et al. |
| 8,839,714 B2 | 9/2014 | Schjerven et al. |
| 8,839,779 B2 | 9/2014 | Wiker et al. |
| 8,863,734 B2 | 10/2014 | Shaffer |
| 8,960,234 B2 | 2/2015 | Cadeau et al. |
| 9,080,678 B2 | 7/2015 | Naumann |
| 9,291,364 B2 | 3/2016 | Okamoto et al. |
| 9,297,537 B2 | 3/2016 | Hensley et al. |
| 2001/0038876 A1 | 11/2001 | Anderson |
| 2001/0051107 A1* | 12/2001 | Lochschmied ......... F23N 1/022 431/12 |
| 2002/0013819 A1 | 1/2002 | Lim et al. |
| 2002/0029695 A1 | 3/2002 | Gongwer et al. |
| 2002/0046474 A1 | 4/2002 | Novak et al. |
| 2002/0070099 A1 | 6/2002 | Neely |
| 2003/0213371 A1 | 11/2003 | Saunders |
| 2003/0221686 A1 | 12/2003 | Ahmady |
| 2004/0040950 A1 | 3/2004 | Carbone et al. |
| 2004/0083687 A1 | 5/2004 | Christman et al. |
| 2004/0187709 A1 | 9/2004 | Murthy et al. |
| 2004/0237741 A1 | 12/2004 | Stinnett et al. |
| 2005/0021407 A1 | 1/2005 | Kargman |
| 2005/0109216 A1 | 5/2005 | Jones et al. |
| 2005/0132899 A1 | 6/2005 | Huang et al. |
| 2006/0006163 A1 | 1/2006 | Carbone et al. |
| 2006/0096973 A1 | 5/2006 | Powell |
| 2006/0163238 A1 | 7/2006 | Miller et al. |
| 2007/0006865 A1 | 1/2007 | Wilker et al. |
| 2007/0012307 A1 | 1/2007 | Wilker et al. |
| 2007/0137633 A1 | 6/2007 | McFadden |
| 2007/0272228 A1 | 11/2007 | Slaby |
| 2008/0035746 A1 | 2/2008 | Willms |
| 2008/0092754 A1* | 4/2008 | Noman ................. 99/443 C |
| 2008/0124668 A1 | 5/2008 | Schultz et al. |
| 2008/0182214 A1 | 7/2008 | Cox et al. |
| 2008/0216812 A1 | 9/2008 | Dougherty |
| 2008/0245359 A1 | 10/2008 | Williamson |
| 2008/0289619 A1 | 11/2008 | Schjerven, Sr. et al. |
| 2009/0075224 A1 | 3/2009 | Wiker et al. |
| 2009/0223503 A1 | 9/2009 | Wilker et al. |
| 2010/0001087 A1 | 1/2010 | Gum |
| 2010/0319551 A1 | 12/2010 | Cox et al. |
| 2011/0048244 A1 | 3/2011 | Wiker |
| 2011/0048245 A1 | 3/2011 | Schjerven, Sr. et al. |
| 2011/0269085 A1 | 11/2011 | Wiker et al. |
| 2012/0180775 A1 | 7/2012 | Waltz et al. |
| 2013/0000628 A1 | 1/2013 | Wiker et al. |
| 2013/0008424 A1 | 1/2013 | Wiker et al. |
| 2014/0174301 A1 | 6/2014 | Moon et al. |
| 2014/0199446 A1 | 7/2014 | Huegerich |
| 2014/0261371 A1 | 9/2014 | Van Camp et al. |
| 2014/0360381 A1 | 12/2014 | Wiker et al. |
| 2014/0360382 A1 | 12/2014 | Schjerven, Sr. et al. |
| 2015/0157171 A1 | 6/2015 | Janecka |
| 2015/0230658 A1 | 8/2015 | De Luca et al. |
| 2016/0195285 A1 | 7/2016 | Gum |

FOREIGN PATENT DOCUMENTS

| | | |
|---|---|---|
| EP | 0830814 | 3/1998 |
| FR | 2454596 | 11/1980 |
| GB | 2215177 | 9/1989 |
| JP | 60062511 A | 4/1985 |
| JP | 2004329107 | 11/2004 |
| WO | 19890012784 | 12/1989 |
| WO | 0122823 | 4/2001 |
| WO | 2004076928 | 9/2004 |
| WO | 2005023006 | 3/2005 |
| WO | 2005094647 | 10/2005 |
| WO | 2005112650 | 12/2005 |
| WO | 2006101531 | 9/2006 |
| WO | 2007050136 | 5/2007 |
| WO | 2008026031 | 3/2008 |

(56) References Cited

FOREIGN PATENT DOCUMENTS

| WO | 2008044107 | 4/2008 |
|---|---|---|
| WO | 2010080160 | 7/2010 |
| WO | 2011025666 | 3/2011 |

OTHER PUBLICATIONS

Bakers Pride Oven Company, Inc., Model VHVA-1620E Electric Forced Air Counter Top Conveyor Ovens (Mar. 2003) 2 pages.
Bakers Pride Oven Company, Inc., Model VHVA-1828E DualAir Electric Impingement Counter Top Conveyor Ovens (Jan. 2005) 2 pages.
Bakers Pride Oven Company, Inc., VH1620E, VHVA1620E, VH1828E & VHVA1828E Electric Countertop Conveyor Ovens— Parts Lists & Exploded Views (May 2005) 5 pages.
Canadian Intellectual Property Office Action, Canadian Patent Application No. 2,625,621, dated Feb. 10, 2011.
Canadian Intellectual Property Office Action, Canadian Patent Application No. 2,625,621, dated Mar. 5, 2010.
EP 058250168 Extended European Search Report dated May 24, 2012, 5 pages.
EP 06772564 Extended European Search Report and Written Opinion dated Mar. 6, 2012, 8 pages.
Grainger, 7.4 Electrical Diagram, 3270-TS-D Left Hand Side, XLT-3200-TS-D Installation & Operation Manual (2004) p. 48.
Grainger, 7.5 Electrical Diagram, 3270-TS-D Right Hand Side, XLT-3200-TS-D Installation & Operation Manual (2004) p. 49.
International Preliminary Report on Patentability, International Patent Application No. PCT/US05/09546, completed Jan. 8, 2006.
International Preliminary Report on Patentability, International Patent Application No. PCT/US05/38783, completed Dec. 30, 2008.
International Preliminary Report on Patentability, International Patent Application No. PCT/US06/22304, completed Dec. 3, 2007.
International Preliminary Report on Patentability, International Patent Application No. PCT/US2009/030727, dated Mar. 16, 2011.
International Search Report and Written Opinion, International Patent Application No. PCT/US2009/030727, dated Mar. 3, 2009.
International Search Report and Written Opinion, International Patent Application No. PCT/US2050/045322, dated Oct. 7, 2010.
International Search Report and Written Opinion for Application No. PCT/US05/09546, dated Sep. 2, 2005.
International Search Report and Written Opinion for Application No. PCT/US05/38783, dated Jun. 14, 2006.
International Search Report and Written Opinion for Patent Application No. PCT/US06/22304, dated Apr. 27, 2007.
Middleby Marshall, Owner's Operating & Installation Manual for Gas Oven Models Series PS360EWB (Apr. 1996) 108 pages.
Panasonic, Ideas for Life, Programmable Controller FP-X, Matsushita Electric Works, Ltd. (2005) 18 pages.
Selectra, A200 Signal Conditioner Bulletin MS2036-01/96 (Jan. 1996) Maxitrol Company; Southfield USA.
Selectra, AP300 Signal Conditioner Bulletin MS2036A-03/00 (Mar. 2000) Maxitrol Company; Southfield USA.
U.S. Patent and Trademark Final Office Action for U.S. Appl. No. 11/526,133, dated Jul. 20, 2010.
U.S. Patent and Trademark Final Office Action, received for U.S. Appl. No. 11/526,133, dated Apr. 29, 2009.
U.S. Patent and Trademark Non-Final Office Action, received for U.S. Appl. No. 11/526,133, dated Aug. 6, 2008.
U.S. Patent and Trademark Non-Final Office Action, received for U.S. Appl. No. 11/526,133, dated Nov. 23, 2009.
International Search Report and Written Opinion of the International Searching Authority received in International Patent Application No. PCT/US04/05153, dated Aug. 31, 2004.
International Preliminary Report on Patentability received in International Patent Application No. PCT/US04/05153, dated Sep. 19, 2005.
U.S. Appl. No. 12/785,050 Office Action dated Jan. 28, 2013 (7 pages).
Canadian Intellectual Property Office Action, Canadian Patent Application No. 2,772,293, dated Jul. 23, 2013.
U.S. Patent and Trademark Non-Final Office Action, received for U.S. Appl. No. 12/233,969, dated Apr. 13, 2010.
U.S. Patent and Trademark Final Office Action, received for U.S. Appl. No. 12/233,969, dated Dec. 8, 2010.
U.S. Patent and Trademark Non-Final Office Action, received for U.S. Appl. No. 13/179,309, dated Dec. 4, 2013.
U.S. Patent and Trademark Non-Final Office Action, received for U.S. Appl. No. 13/611,877, dated Nov. 5, 2013.
U.S. Patent and Trademark Non-Final Office Action, received for U.S. Appl. No. 12/550,034, dated Apr. 8, 2013.
U.S. Patent and Trademark Non-Final Office Action, received for U.S. Appl. No. 10/546,104, dated Oct. 3, 2008.
U.S. Patent and Trademark Final Office Action, received for U.S. Appl. No. 10/546,104, dated Feb. 18, 2009.
U.S. Patent and Trademark Non-Final Office Action, received for U.S. Appl. No. 12/463,051, dated May 9, 2011.
U.S. Patent and Trademark Non-Final Office Action, received for U.S. Appl. No. 13/612,522, dated Sep. 13, 2013.
Canadian Intellectual Property Office Action, Canadian Patent Application No. 2,783,217, dated Dec. 9, 2013.
U.S. Patent and Trademark Final Office Action, received for U.S. Appl. No. 13/179,309, dated Oct. 6, 2014.
U.S. Patent and Trademark Final Office Action, received for U.S. Appl. No. 12/550,034, dated May 23, 2014.
U.S. Patent and Trademark Final Office Action, received for U.S. Appl. No. 13/612,522, dated Jun. 4, 2014.
Office Action from co-pending U.S. Appl. No. 13/179,309, dated Dec. 16, 2015, 21 pages.
U.S. Patent and Trademark Office Action, received for U.S. Appl. No. 14/469,058, dated Jul. 26, 2016, 7 pages.
U.S. Patent and Trademark Non-Final Office Action for U.S. Appl. No. 13/179,309, dated Dec. 16, 2015, 21 pages.
U.S. Patent and Trademark Final Office Action, received for U.S. Appl. No. 13/612,522, dated Nov. 25, 2015, 12 pages.
U.S. Patent and Trademark Non-Final Office Action, received for U.S. Appl. No. 13/612,522, dated Apr. 14, 2016, 10 pages.
U.S. Patent and Trademark Final Office Action, received for U.S. Appl. No. 13/179,309, dated Jun. 15, 2016, 21 pages.
U.S. Patent and Trademark Non-Final Office Action, received for U.S. Appl. No. 13/612,522, dated Oct. 14, 2016.
European Patent Office Communication, received for European Application No. 06772564.8, dated Jul. 14, 2017, 7 pages.
U.S. Patent and Trademark Final Office Action for U.S. Appl. No. 13/612,522 dated Apr. 5, 2017.
Office Action from the United States Patent and Trademark Office, received for U.S. Appl. No. 13/612,522, dated Nov. 9, 2017, 10 pages.
Office Action from the United States Patent and Trademark Office, received for U.S. Appl. No. 15/447,058, dated Sep. 19, 2017, 25 pages.
Translation of JP60062511 "Method for Controlling Temperature in Oven of Heater-Cooker" Hisao Kano (11 pages).
Office Action from the United States Patent and Trademark Office for U.S. Appl. No. 13/612,522 dated Apr. 17, 2015 (11 pages).
Office Action from co-pending U.S. Appl. No. 13/612,522, dated Nov. 18, 2014, 11 pages.
Office Action from co-pending U.S. Appl. No. 12/550,034, dated May 19, 2015, 33 pages.
European Communication for European Application No. 05 825 016.8, dated Sep. 12, 2014, 4 pages.
European Communication for European Application No. 05 825 016.8, dated Jan. 13, 2015, 4 pages.
European Communication for European Application No. 05 825 016.8, dated Mar. 3, 2015, 5 pages.

* cited by examiner

SELF-CLEANING OVEN

RELATED APPLICATIONS

This application is a continuation of U.S. patent application Ser. No. 13/612,522, filed on Sep. 12, 2012, which is a continuation of U.S. patent application Ser. No. 12/463,051, filed on May 8, 2009, which is a continuation of U.S. patent application Ser. No. 10/546,104, filed on Jul. 19, 2006, which is a U.S. National Phase Application of International Application No. PCT/US04/05153, filed Feb. 20, 2004, which claims priority of U.S. Provisional Patent Application No. 60/449,545, filed on Feb. 21, 2003.

This application is also a continuation of U.S. patent application Ser. No. 12/463,051, filed on May 8, 2009, which is a continuation of U.S. patent application Ser. No. 10/546,104, filed on Jul. 19, 2006, which is a U.S. National Phase Application of International Application No. PCT/US04/05153, filed Feb. 20, 2004, which claims priority of U.S. Provisional Patent Application No. 60/449,545, filed on Feb. 21, 2003.

U.S. patent application Ser. No. 13/612,522 published as U.S. Publication No. 2013/0000628 on Jan. 3, 2013; U.S. patent application Ser. No. 12/463,051 published as U.S. Publication No. 2009/0223503 on Sep. 10, 2009; U.S. patent application Ser. No. 10/546,104 published as U.S. Publication No. 2007/0006865 on Jan. 11, 2007; and International Application No. PCT/US04/05153 published as International Publication No. WO 2004/076928 on Sep. 10, 2004. The entire contents of each of the foregoing applications and publications are hereby incorporated by reference.

FIELD OF THE INVENTION

The present invention relates to a gas-fired tunnel oven, and particularly a gas-fired conveyor oven.

BACKGROUND

Commercial, gas-fired tunnel ovens equipped with conveyors produce, among other things, pizzas, cookies, bread, cakes and donuts. Each oven routinely processes a large volume of food products and, as a result, becomes rather dirty. Bits of the food products themselves, burned food products, and soot from the burners are typical sources of contamination that accumulate during use.

Gas-fired tunnel ovens traditionally have been cleaned manually with detergent and acid solutions. The oven must be taken apart for cleaning by these methods. In addition to the oven walls, roof, and floor, the conveyor used with the tunnel oven must be cleaned, as well as any jet-impingement convection fingers, convection blowers, and fired burners. Cleaning by the traditional methods is tedious and expensive.

SUMMARY

In theory, a gas-fired, commercially-sized tunnel oven might be cleaned by installing electrical heaters at critical points to raise the internal temperature to a range that reduces virtually all contamination to ash. In practice, cleaning a gas-fired tunnel oven by raising the temperature with electrical heaters requires an estimated 50-100 amperes of electricity for each oven. Commercial bakers do not normally have access to this much electrical current, and the cost of installing high current electrical service is a significant financial barrier for most bakers.

Accordingly, there is a need for a self-cleaning, gas-fired tunnel oven suitable for use with a conveyor that can be cleaned without need of disassembly, manual cleaning, or detergents. Commercial bakers would welcome a self-cleaning, gas-fired tunnel oven.

In some embodiments, a conveyor oven having a first mode of operation and a second mode of operation is provided. The conveyor oven generally includes an oven chamber in which food is cooked, a conveyor movable to convey the food through the oven chamber, a burner to generate heat for the oven chamber, at least one blower to circulate air within the oven chamber, and a controller. The burner has a combustion airflow rate, and operates at a first output during the first mode of operation and at a second output that is greater than the first output during the second mode of operation. The blower operates at a first speed during the first mode of operation and at a second speed that is faster than the first speed during the second mode of operation. The controller is responsive to at least one of a burner output and an internal temperature of the oven chamber, and increases the speed of the blower from the first speed during the first mode of operation to the second speed during the second mode of operation responsive to at least one of an increase of the burner output and an increase of the internal temperature of the oven chamber.

Also, in some embodiments, a conveyor oven generally includes an oven chamber in which food is cooked, a conveyor movable to convey the food through the oven chamber, a gas burner configured to generate heat for the oven chamber, at least one blower to circulate air within the oven chamber, and a controller. The gas burner has an adjustable combustion airflow rate and an adjustable gas flow rate. The controller is responsive to at least one of a burner output and an internal temperature of the oven chamber, and increases the combustion airflow rate response to at least one of an increase in the burner output and an increase in the internal temperature of the oven chamber.

Other aspects of the invention will become apparent by consideration of the detailed description and accompanying drawings.

DETAILED DESCRIPTION

Figure 1:
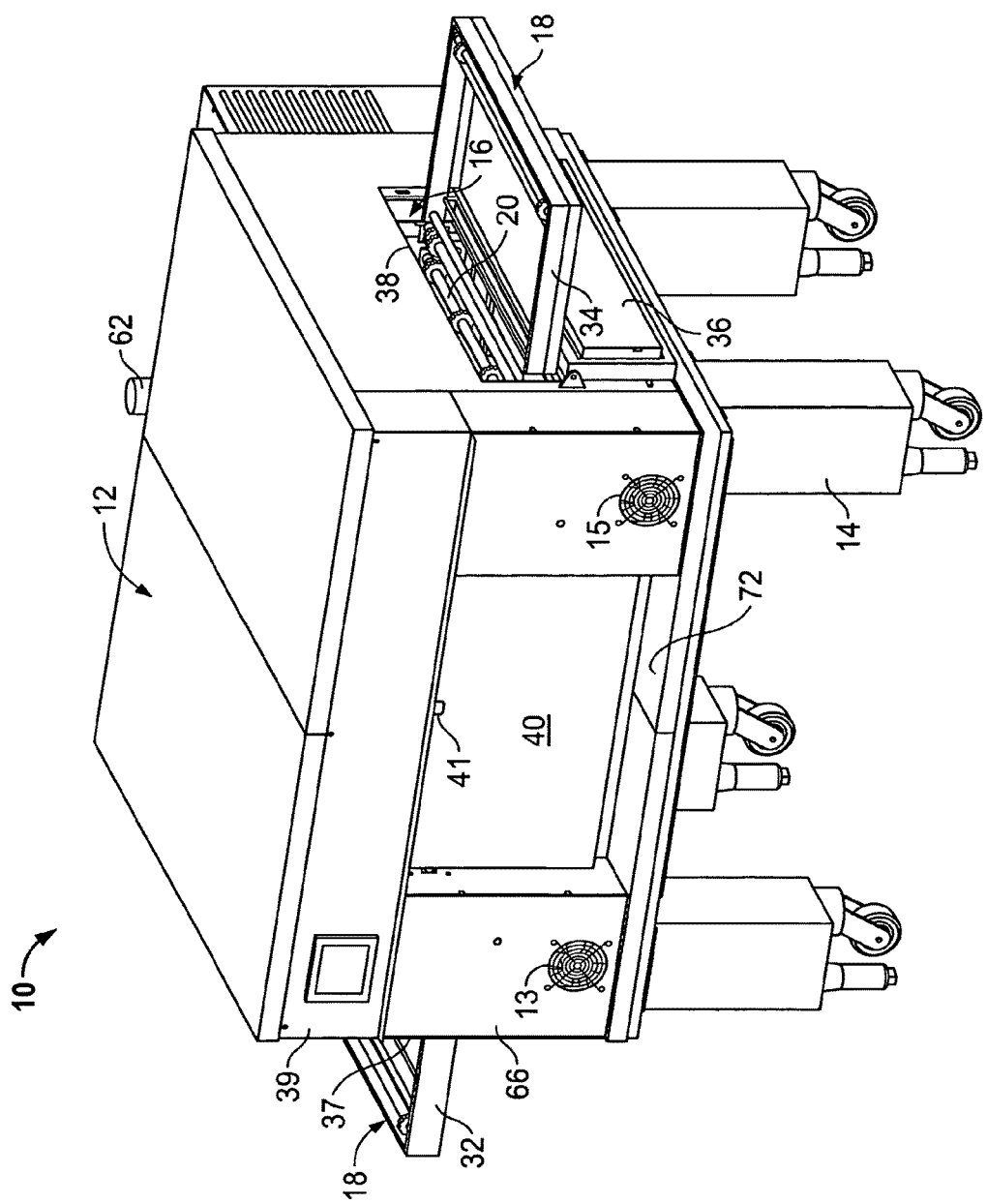
FIG. 1 is a perspective view of a self-cleaning oven with both first and second conveyor extension sections extended, each of the conveyor sections being depicted without its mesh belt for clarity.

According to one embodiment, a pyrolytically self-cleaning, gas-fired, conveyor oven 10, as shown in FIG. 1, includes an oven housing 12 supported on four legs 14. The oven housing 12 surrounds a cooking chamber 16 through which food products are passed on a conveyor assembly 18. The oven 10 also includes a front access door 40 that can be opened using a front access door handle 41.

Figure 2:
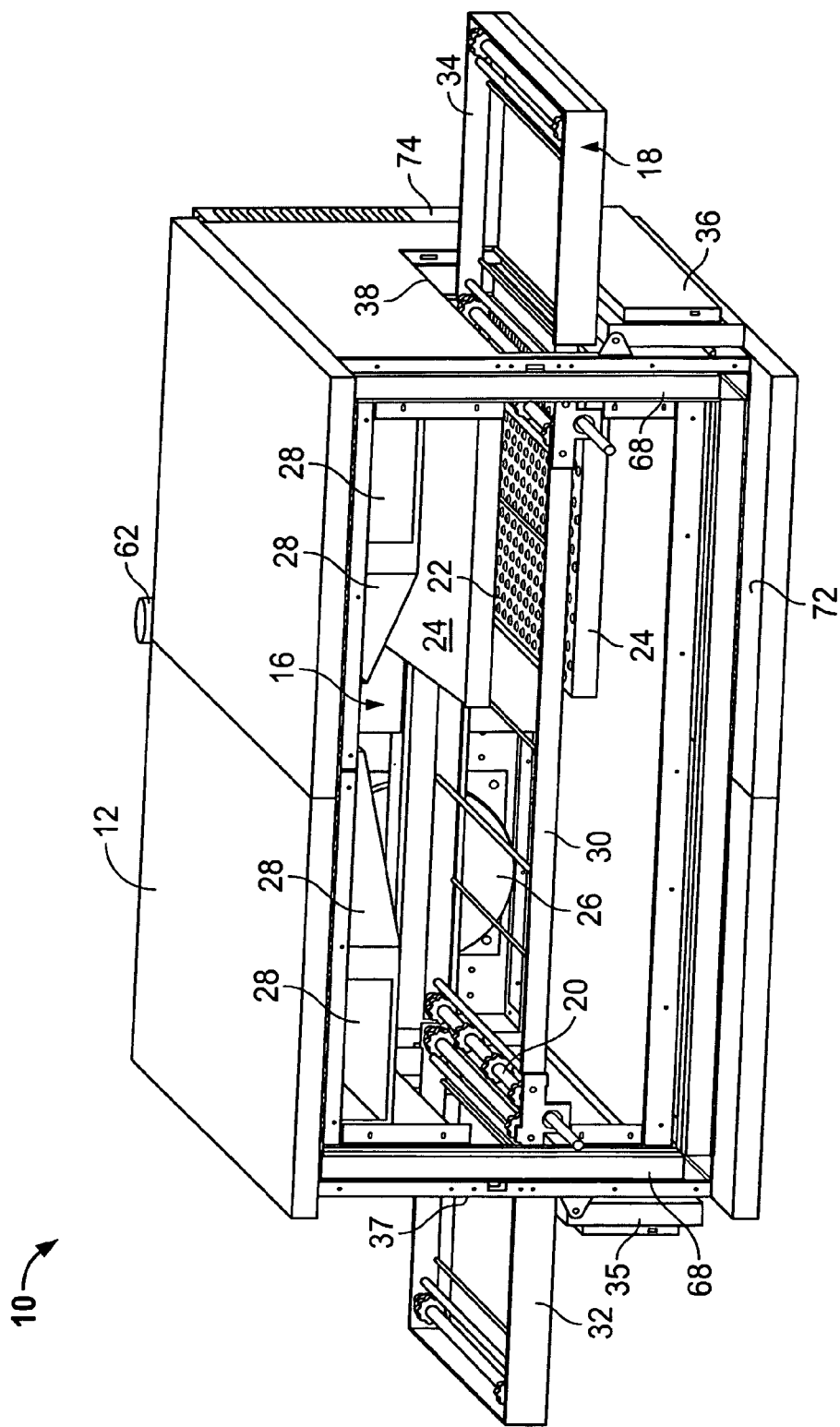
FIG. 2 is a partial perspective view of the oven of FIG. 1 showing a drive shaft, a main conveyor section and the first and second conveyor extension sections, each of the conveyor sections being depicted without its mesh belt for clarity.

As best seen in FIG. 2, the conveyor assembly 18 includes powered rollers 20 that drive a wire mesh conveyor belt (not shown in the Figures) that conveys food through the cooking chamber 16. The powered rollers 20 can be driven in either direction so that, as viewed in FIG. 2, the conveyor belt can convey food through the cooking chamber 16 from left-to-right or right-to-left. Food products can be transported by the conveyor assembly 18 into a first oven opening 37 and out of a second oven opening 38 or, alternatively, into the second oven opening 38 and out of the first oven opening 37. In either case, the motion of the conveyor drive motor (not shown) and, consequently, the motions of the conveyor assembly 18 are precisely and continuously controlled in order to provide the optimum cooking time for the food products. The speed and direction of the conveyor assembly 18 are input by an operator through a control station (not shown).

As the oven 10 is shown in FIGS. 1 and 2, it is configured for cooking food products. That is, the conveyor assembly 18 extends out of the cooking chamber 16 at both ends. Food is placed on the conveyor assembly 18 at either end of the oven 10 and is carried through the cooking chamber 16 to the other end of the oven 10. As best seen in FIG. 2, the conveyor assembly 18 includes a main conveyor section 30 and first and second conveyor extension sections 32, 34 extending out of the cooking chamber 16. Over time, as food products travel back and forth over the conveyor assembly 18, the various sections 30, 32, 34 of the conveyor assembly 18 clog with food debris and otherwise become dirty. Additionally, food particles that drop onto various surfaces and components within the cooking chamber 16 become dirty. To clean the oven 10, the first and second conveyor extension sections 32, 34 can be disconnected from the main conveyor section 30 and inserted into the cooking chamber 16.

Figure 11:
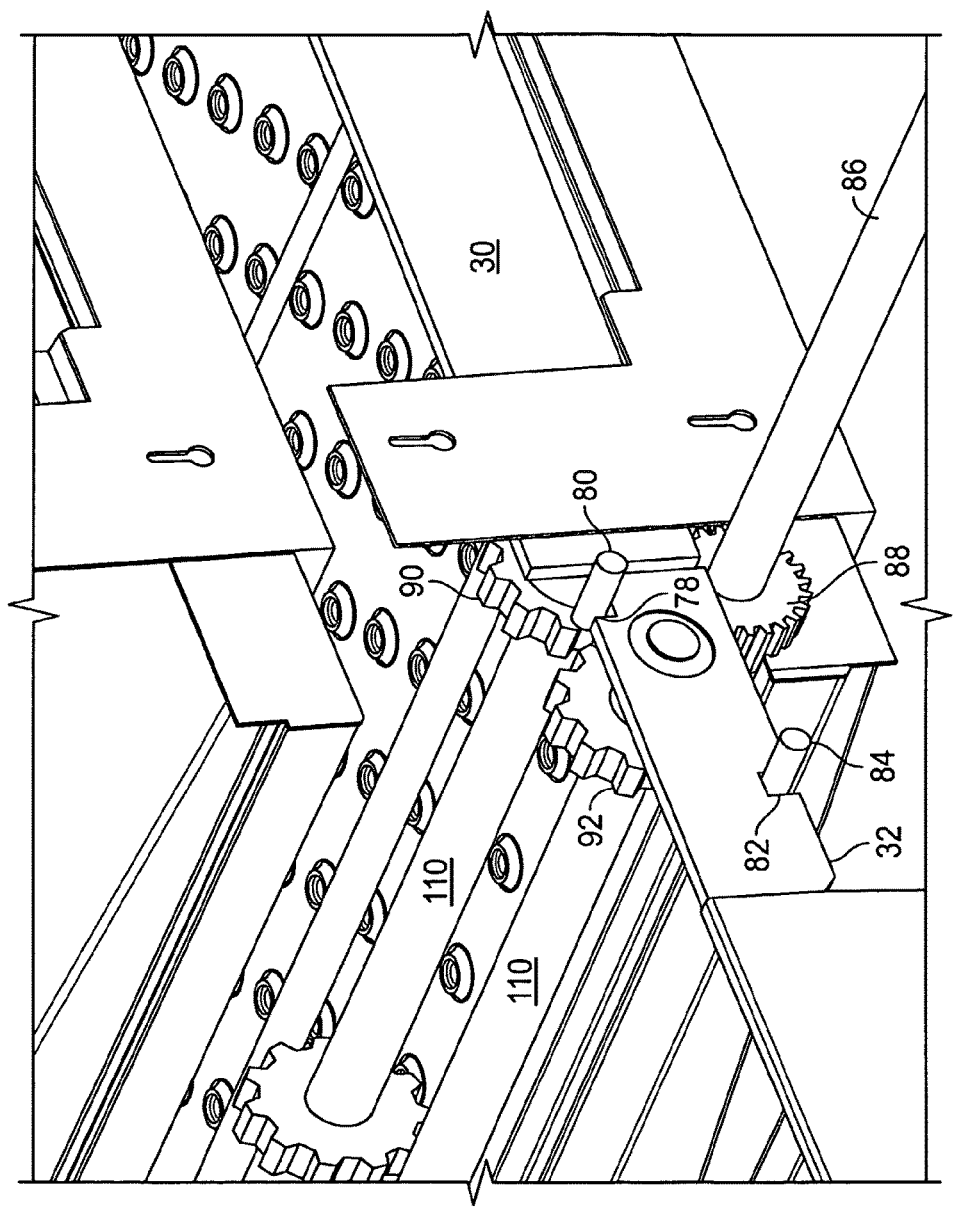
FIG. 11 is a partial perspective view of the oven of FIG. 1 showing a drive shaft, the main conveyor section and the first conveyor extension section, each of the conveyors depicted without its mesh belt for clarity.

The main conveyor 30 is driven by a direct current electric motor operating through a gear reducer. A pulse-controlled conveyor drive motor (not shown) turns a drive shaft 86 which is rigidly attached to a drive gear 88, which are depicted in FIG. 11. The drive motor sends well-defined pulses of electrical energy to move the drive shaft 86 in either a clockwise or counterclockwise direction. Each electrical pulse of the motor moves the drive shaft 86 a reproducible increment. For example, a single pulse may be adjusted to advance the drive shaft 86 by a predetermined number of angular degrees. The frequency of electrical pules determines the speed of the drive shaft 86, and consequently the speed of the conveyor assembly 18, in either direction. The drive gear 88 turns the main conveyor section 30 and the first and second conveyor extension sections 32, 34 by means of follower gears 90, 92 (only one is shown for the first conveyor extension section 32). The follower gears 90, 92 cause conveyor axles 110 to turn, which creates the conveyor motion. The speed of all the conveyor sections, and ultimately, the cooking time of food products traveling through the oven 10, is regulated by the drive motor. The drive motor for oven 10 is controlled by a digital control unit (not shown).

FIGS. 1 and 2 depict both the first conveyor extension section 32 and the second conveyor extension section 34 in an extended and locked position, the conveyor extension sections 32, 34 being both collapsible and extendable. The first conveyor extension section 32 is accompanied by a first insulated door 35 and the second conveyor extension section 34 is accompanied by a second insulated door 36. Both the first and second conveyor extension sections 32, 34 can be separated from the oven housing 12 and inserted into a first oven opening 37 and a second oven opening 38, respectively. After the conveyor extension sections 32, 34 have been inserted into the oven housing 12, the first insulated door 35 can be shut to close the first oven opening 37 and the second insulated door 36 can be shut to close the second oven opening 38.

FIG. 11 is a partial perspective view of oven 10 in which only selected components are shown in order to better communicate the invention. FIG. 11 shows the relationship of the main conveyor section 30 to the first conveyor extension section 32 when the first conveyor extension section 32 is in the extended position. The first and second conveyor extension sections 32, 34 (only one is shown in FIG. 11) each include an upper notch 78, sized and shaped to receive an upper peg 80, which is attached to an inside wall of the oven (not shown in FIG. 11). The first and second conveyor extension sections 32, 34 also each include a lower notch 82 for receiving a lower peg 84, which is also attached to the inside wall (not shown). Lifting the first and second conveyor extension sections 32, 34 causes them to rotate about the upper pegs 80 until the lower pegs 84 disengage from the lower notches 82.

Figure 6:
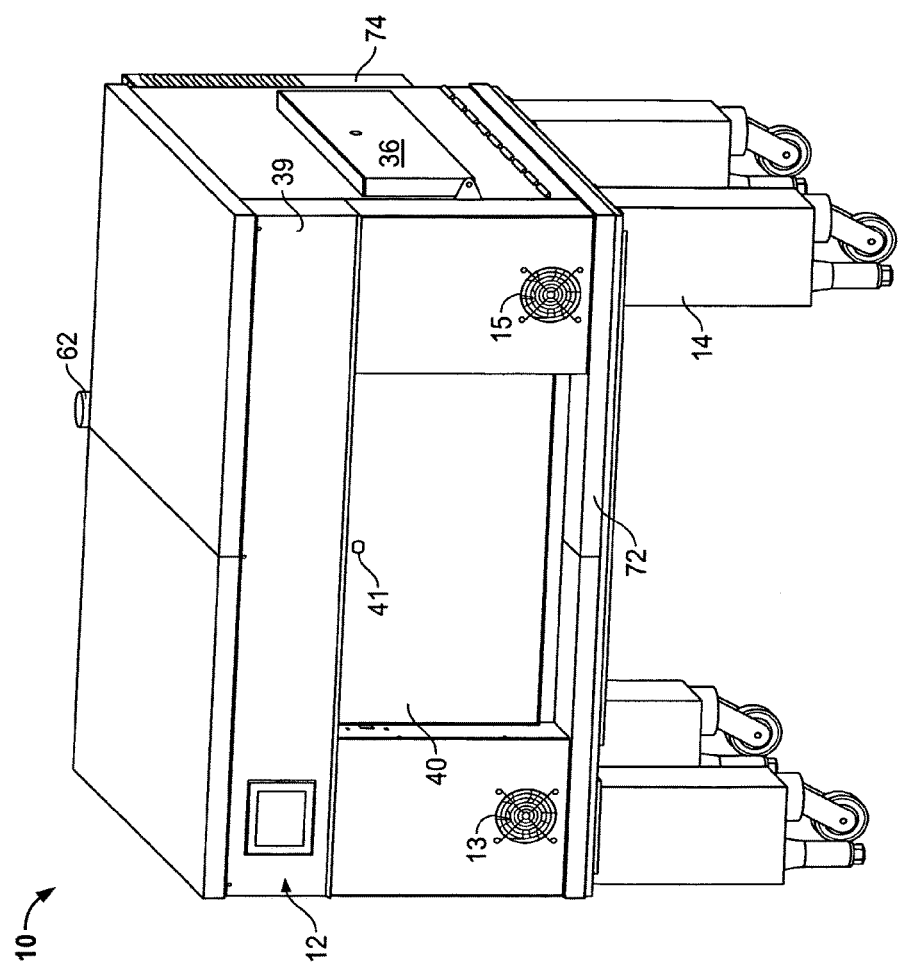
FIG. 6 is a front elevation view of the oven of FIG. 1 with both conveyor extension sections retracted.

With the lower notches 82 disengaged, the first and second conveyor extension sections 32, 34 can be separated from oven 10 and inserted into the first and second oven openings 37, 38 so that the first and second insulated doors 35, 36 close the first and second oven openings 36, 38, as shown in FIG. 6.

In order to assemble the conveyor assembly 18 for baking, the first conveyor section 32 is partially inserted into the first oven opening 37 and locked in an extended position with respect to the main conveyor section 30. The first conveyor section 32 is locked by inserting the pair of upper notches 78 formed by the sides of the first conveyor section 32 under a pair of upper pegs 80 mounted in the oven 10. A pair of lower notches 82 also formed by the sides of the first conveyor extension 32 are then rotated onto a pair of lower pegs 84 mounted in the oven 10. The second conveyor extension section 34 is similarly inserted into the second oven opening 38 and locked in an extended position with respect to the main conveyor section 30.

Figure 13:
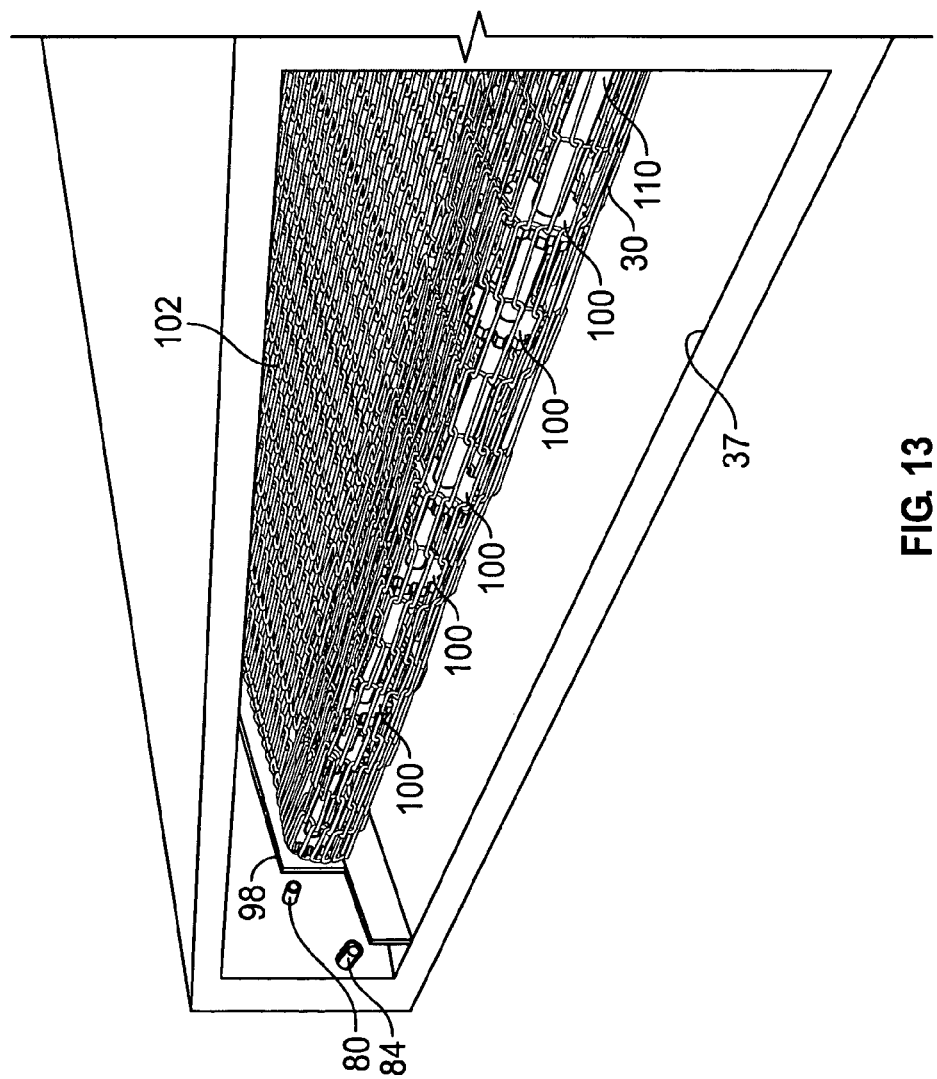
FIG. 13 is a view of the main conveyor section through an oven opening with one of the conveyor extension sections removed.

The first conveyor extension section 32 is separated from the oven 10 in FIG. 13, providing a close-up view of the first oven opening 37 and the main conveyor section 30. The drive shaft 86 of the main conveyor section 30 extends between two side plates 96, although only one of the side plates 96 is visible in FIG. 13. FIG. 13 also depicts five of the six drive sprocket wheels 100 attached to the conveyor axle 110 of the main conveyor section 30. A mesh belt 102 is shown as an endless chain engaged with the drive sprocket wheels 100. One of the upper pegs 80 and one of the lower pegs 84, which cooperate for locking the first conveyor section 32 (not shown in FIG. 13) in an extended position, are also visible in FIG. 13.

Figure 14:
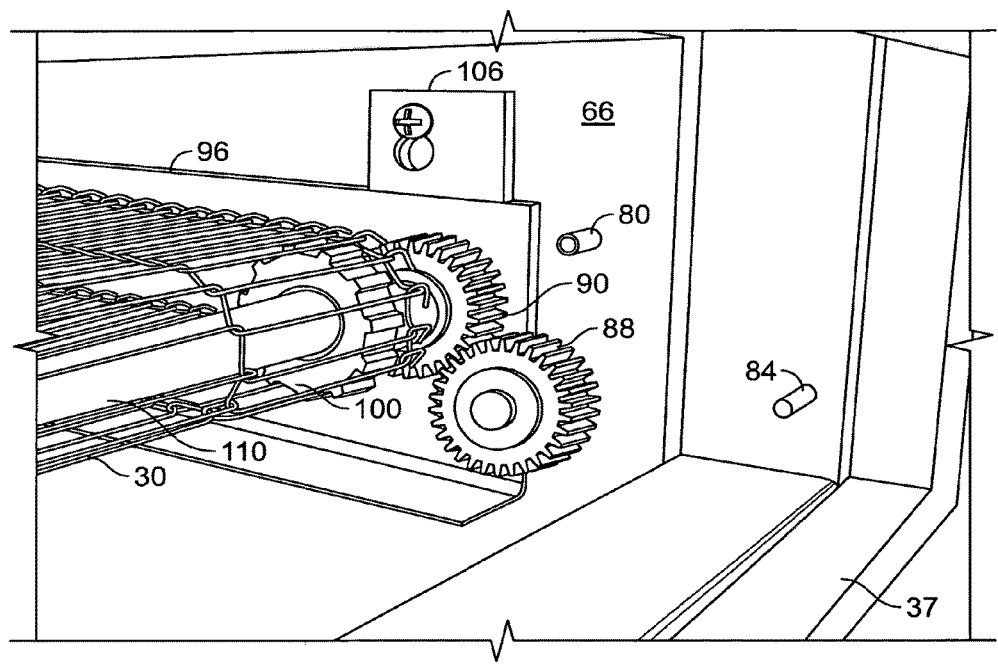
FIG. 14 is a view of the main conveyor section and its connection to the front wall of the oven depicted in FIG. 1.

The sixth of the six drive sprocket wheels 100 of the main conveyor section 30 is shown in FIG. 14 along with one of the two side plates 96. A bracket 106 extends from one of the side plates 96 and is fastened to the front wall 66 for supporting the main conveyor section 30. The front wall 66 also supports one of the upper pegs 80 and one of the lower pegs 84.

Figure 15:
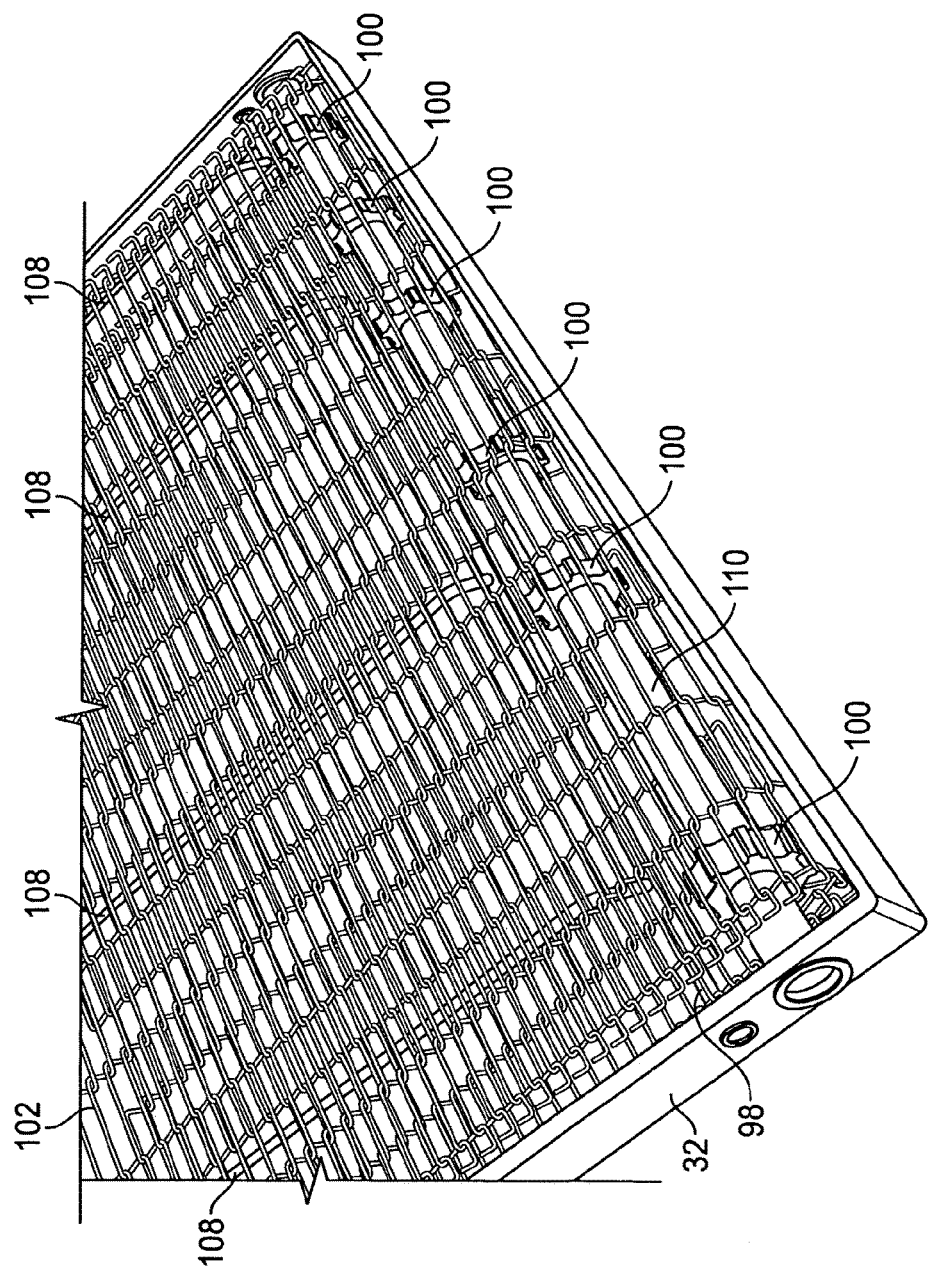
FIG. 15 is a view of one of the conveyor extension sections separated from the oven of FIG. 1.
Figure 16:
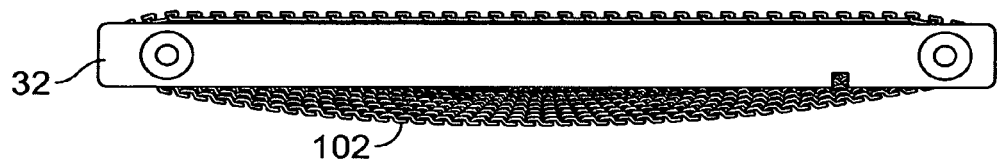
FIG. 16 is a side view of the mesh belt of one of the conveyor extension sections.

A close-up, partial perspective view of the first conveyor extension section 32 is presented in FIG. 15. The mesh belt 102 of the first conveyor extension section 32 tends to sag if not supported, as illustrated in FIG. 16. FIG. 15 depicts four guides 108, which are provided to support the mesh belt 102. The guides 108 are in turn supported by guide supports 98, which extend the width of the first conveyor extension section 32. FIG. 15 also shows the conveyor axle 110 and the six drive sprocket wheels 100 for the first conveyor section, which are used to facilitate the progress of the mesh belt 102.

Figure 4:
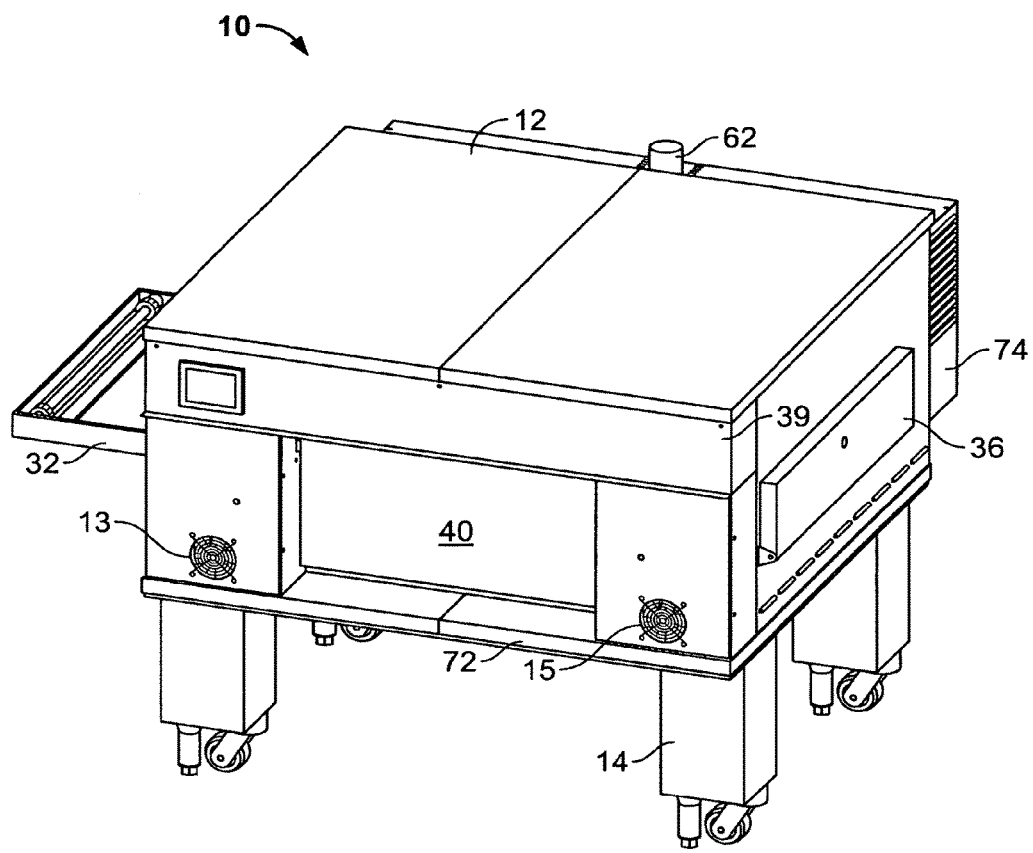
FIG. 4 is a perspective view of the oven of FIG. 1 with the first conveyor extension section extended and the second conveyor extension section retracted, the first conveyor extension section being shown without its mesh belt for clarity.

FIG. 4 shows the second conveyor extension section 34 inserted into the cooking chamber 16 and a second insulated door 36 closed to seal off the second oven opening 38 through which the second conveyor extension section 34 previously extended.

Figure 5:
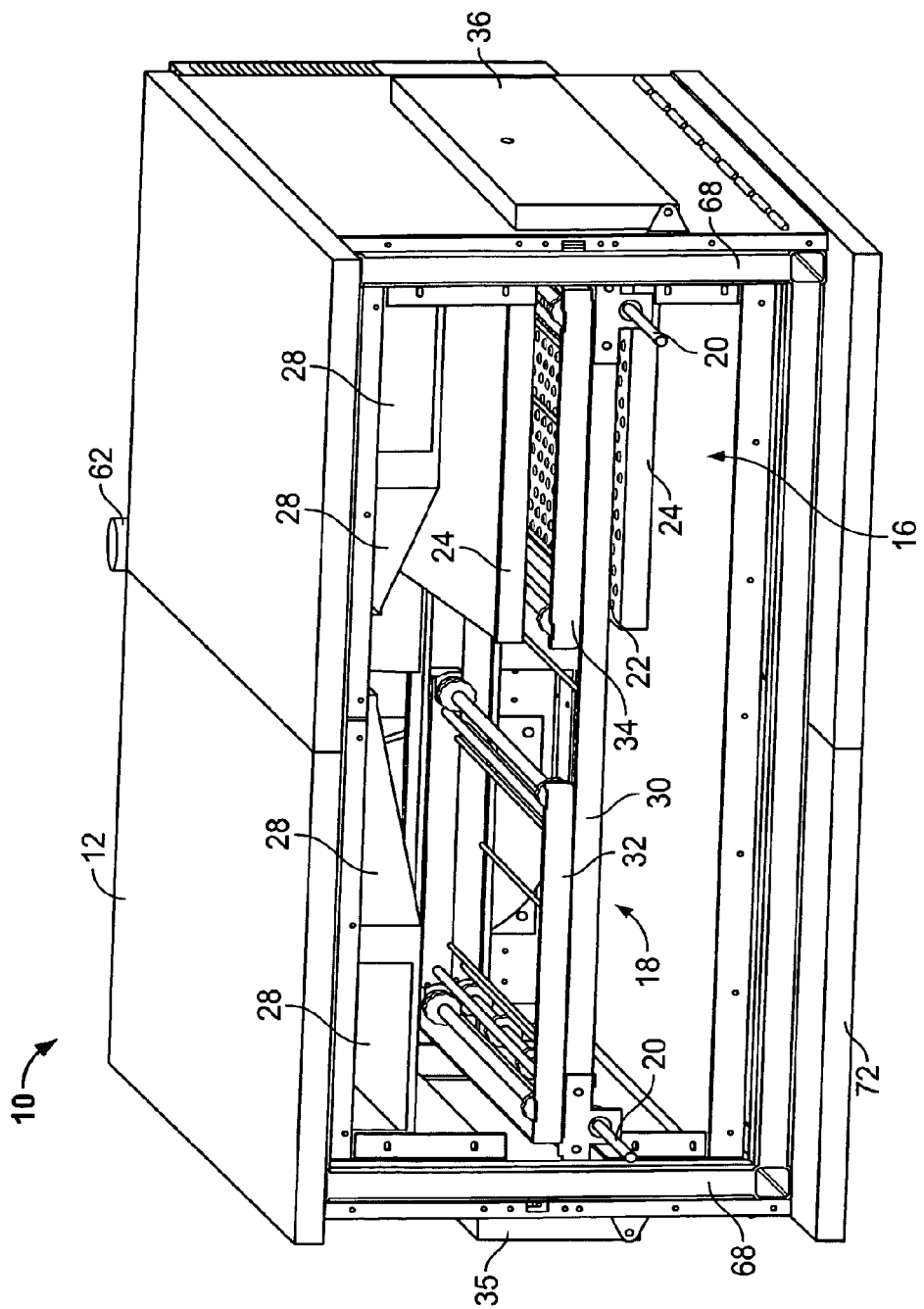
FIG. 5 is a view of the oven of FIG. 1 with the front access door removed, showing both conveyor extension sections in their retracted positions.

FIG. 5 further illustrates that the main conveyor section 30 supports the first conveyor extension section 32 when the first conveyor extension section 32 is inserted into the first oven opening 37. Inserting the first conveyor extension section 32 into first oven opening 37 allows the first insulated door 35 to close the first oven opening 37. Similarly, the main conveyor section 30 supports the second conveyor extension section 34, when the second conveyor extension section 34 is inserted into the second oven opening 38 so that the second insulated door 36 can close the second oven opening 38. With the insulated doors 35, 36 closed, the cooking chamber 16 of the oven 10 is completely sealed, as shown in FIG. 6. The cooking chamber 16 can then be superheated to approximately 900°, turning all food debris in the oven 10 to ash. When the food debris has been burned and turned to ash, the front access door 40 can be opened using the front access door handle 41 and the ash can be cleaned from the oven 10.

As seen in FIGS. 13-16 each of conveyors includes endless stainless steel mesh belts 102 capable of traveling in either direction and at variable speeds. Crumb trays (not shown) are removably installed underneath the first and second conveyor extension sections 32, 34.

Figure 3:
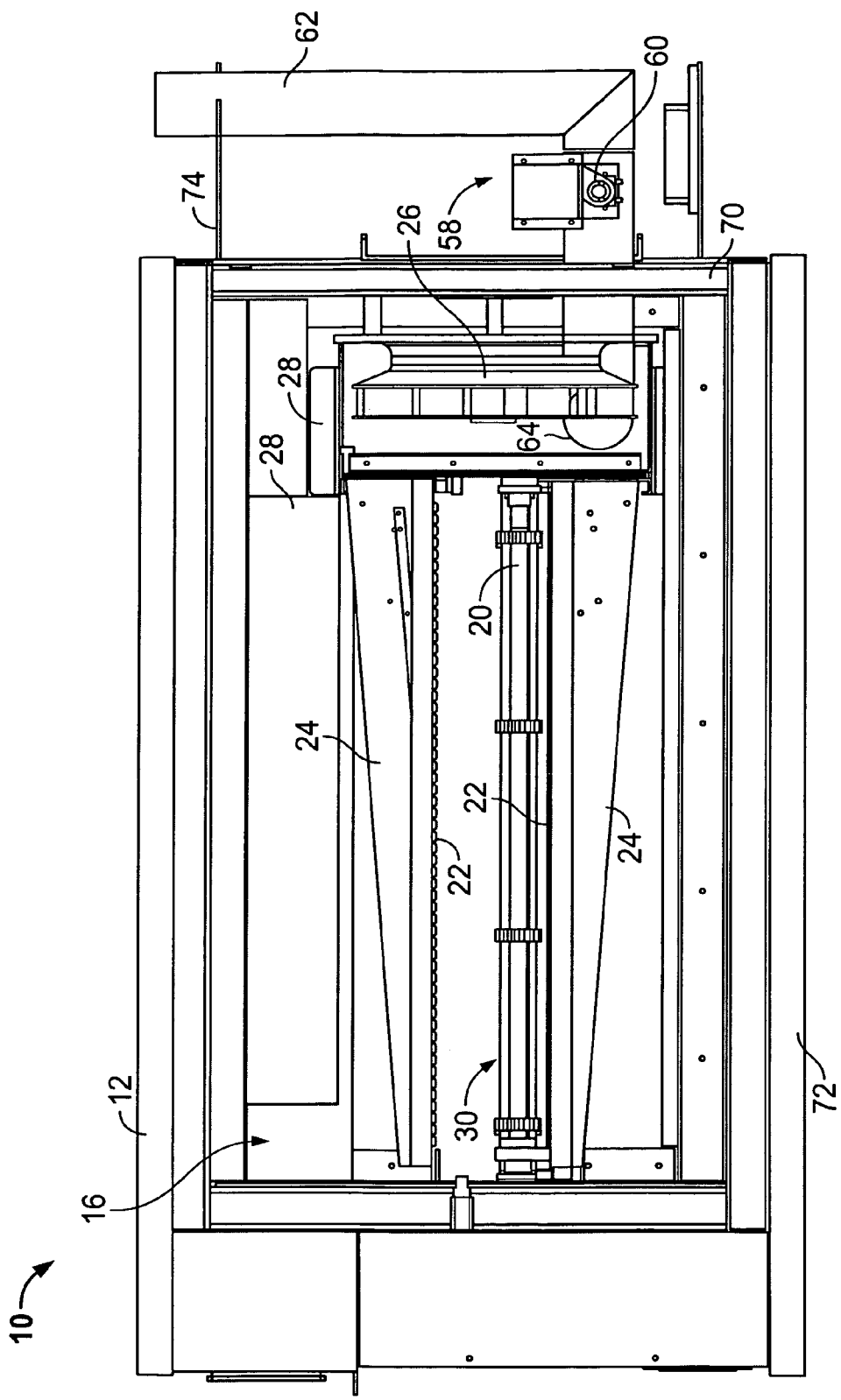
FIG. 3 is a side view of the oven of FIG. 1 with one of the side walls removed, showing one of the blower and motor assemblies and two air-impingement fingers.

As food travels through the cooking chamber 16, it is cooked by the impingement of hot air that is directed at the main conveyor section 30 through nozzles 22 located on fingers 24. As shown in FIGS. 2 and 3, the depicted conveyor oven 10 includes two fingers 24, a lower finger having nozzles 22 directing air upward at the bottom of the conveyor assembly 18 and an upper finger having nozzles 22 (not seen in FIG. 2) directing air downward at the top of the main conveyor section 30. The fingers 24 contain an inner distributor plate (not shown) and a perforated outer plate containing the nozzles 22 that collimate the heated air and evenly distribute the heated air across the main conveyor section 30 on which the food products ride. The oven 10 depicted in FIG. 3 includes two fingers 24 (one above the conveyor and one below), however, the oven 10 can accommodate a number of bottom fingers 24 and top fingers 24. Any combination or deletion of fingers may be employed.

Figure 12:
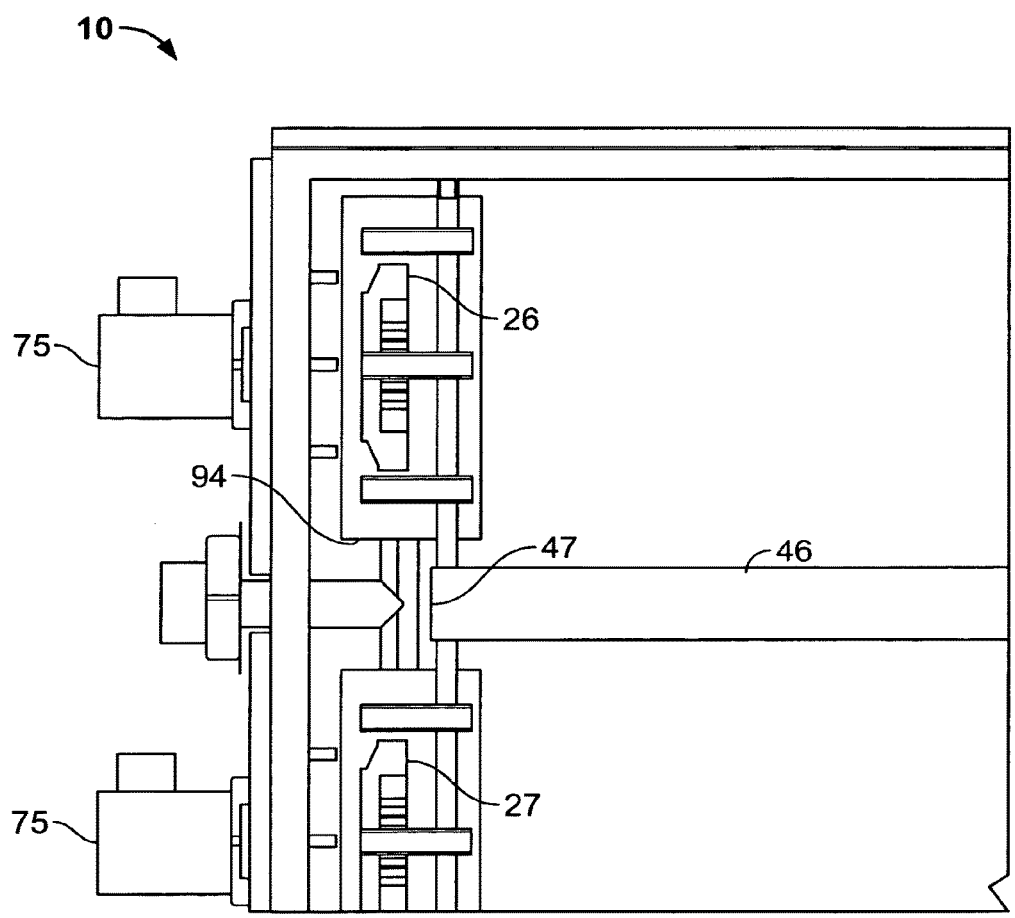
FIG. 12 is an overhead view of the oven of FIG. 1 with the ceiling and overhead insulation removed, showing a roof-mounted flame tube assembly and two blower and motor assemblies.

The hot air directed through the fingers 24 is heated by a burner assembly 42 (best seen in FIGS. 7 and 8) located under an instrument panel 39 (FIG. 1) on the front of the oven 10. The burner assembly 42 creates the heat used by the oven 10 during both cooking (baking) and self-cleaning. The burner assembly 42 heats the hot air that flows through the fingers 24 to cook food products passing along the conveyor assembly 18. The burner assembly 42 burns a gas and air mixture at a burner 44, which shoots a flame down a flame tube 46. The flame heats the air contained in the flame tube 46, and the heated air exits the flame tube through an outlet 47 and into a plenum 94, as seen in FIG. 12. The open space of the plenum 94, located in front of the back wall 70 of the oven 10, provides the hot air with a directed passageway toward a blower housing 74 where it will be circulated throughout the cooking chamber 16.

Because the burner 44 is called upon to satisfy a wide range of heat output requirements, it is necessary to control the flow of gas and air supplied to the burner 44. While the burner 44 is operating, the flow of both air and heating gas to the burner 44 is modulated by a combined control system. With this combined modulating control system for combustion air and heating gas, optimum combustion conditions within the burner 44 can be maintained approximately constant over a range of heat outputs. With this combined modulating control system, the ratio of combustion air flow to heating gas flow can be optimized and maintained so that combustion is thermally efficient and environmentally sound, producing a minimum of objectionable byproducts.

The ratio of combustion air to heating gas can be optimized to produce, for example, environmentally clean burning and the ratio will remain close to the optimum value whether the programmable controller (not shown) calls for high heat or low heat. Alternatively, the ratio may be optimized for optimal fuel consumption, optimal heat-up time or any other results that the operator desires and the ratio will not vary substantially with heat output. This modulating control system for combustion air and heating gas over a range of heat output is especially advantageous for a self-cleaning oven, such as the oven 10, where a range of heat outputs is required.

The burner assembly 42 includes an actuator 48 that operates an air valve 50 that regulates the amount of air entering the burner 44 from a combustion air blower 52. The actuator 48 controls the position of the air valve 50 based on signals received from other control instruments and sensors (not shown) included in oven 10. A valve link 54 coordinates the movement of the gas valve 56 with that of the air valve 50. The gas valve 56 receives gas from an automatic gas shut-off valve 57 and modulates the flow of this gas so that the ratio of heating gas to combustion air is relatively constant for a wide range of heating loads. The valve link 54 connects the air valve 50 to the gas valve 56 so that as the actuator 48 opens and closes the air valve 50, the gas valve 56 is correspondingly opened and closed, proportionally mixing the air and gas as they enter the burner 44. The air and gas mixture is then ignited inside the burner 44 and a flame shoots down the flame tube 46.

Figure 7:
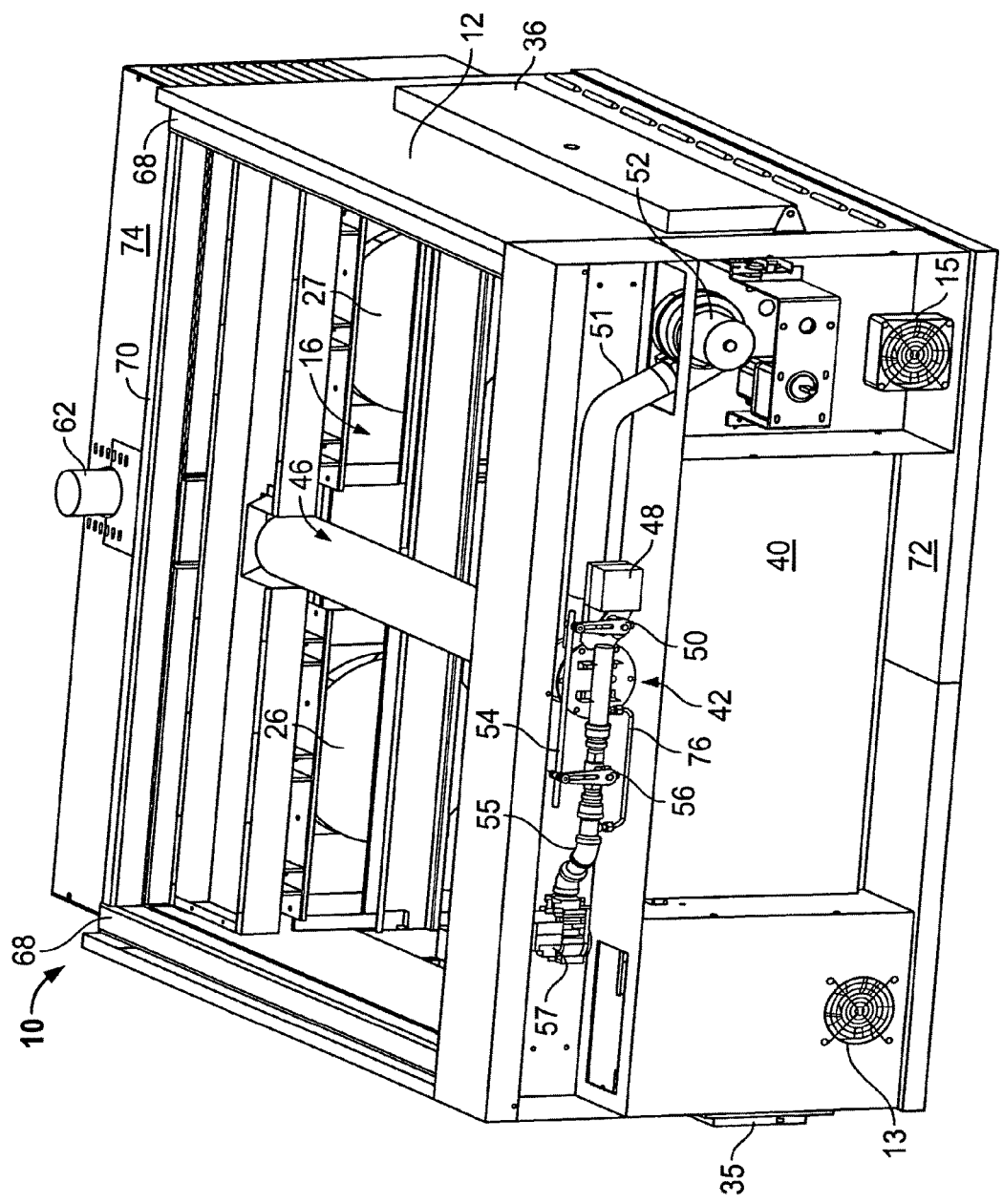
FIG. 7 is an overhead perspective view of the oven of FIG. 1 with the ceiling and overhead insulation removed, showing a roof-mounted burner assembly, two blower and motor assemblies, and a vent arrangement.
Figure 8:
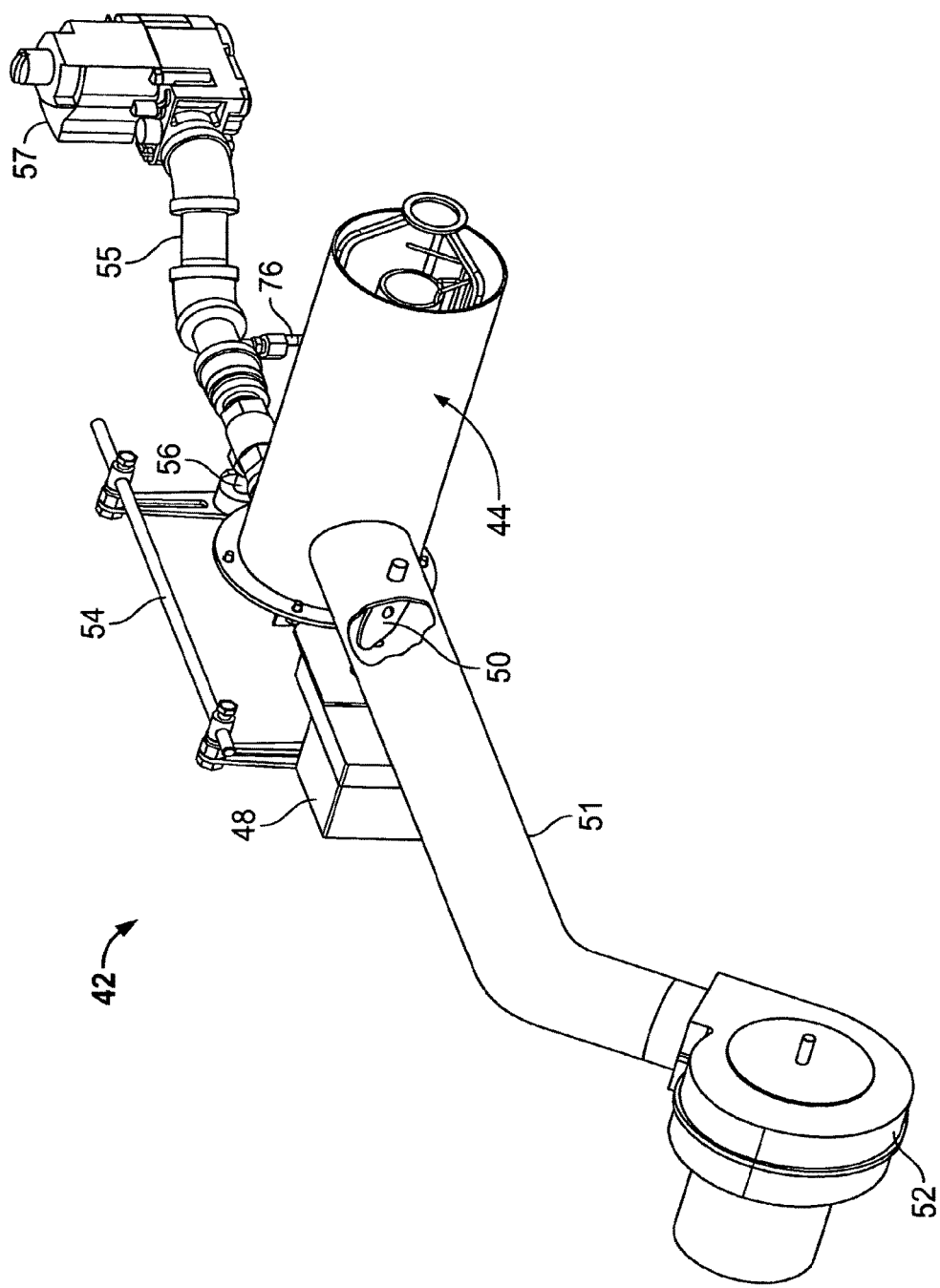
FIG. 8 is a close-up perspective view of the burner assembly of FIG. 3 showing a gas shut-off valve, a gas valve, an air valve, a valve link that coordinates the action of the gas valve with the action of the air valve, and a burner.

One of the advantages of modulating air and gas control, as provided by the valve link 54, is that the amount of excess air in the flame tube 46 remains substantially the same during high and low heating load periods. This advantage is particularly important in a self-cleaning, pyrolitic oven, which exhibits a significantly higher heating load during self-cleaning than conventional cooking heating loads. Although the valve link 54 depicted in FIGS. 6, 7 and 8 is mechanical, it is also contemplated that the positions of an air valve and a gas valve in modulating air and gas control systems may alternatively be coordinated by, for example, utilizing electronically-controlled actuators for each of the valves and coordinating their positions by means of one or more electronic controllers.

The burner 44 may be mounted anywhere in the oven. Preferably, the burner 44 is roof-mounted as shown and sends its flame along the inside of the flame tube 46 mounted adjacent the ceiling of the oven 10. During operation of the oven 10, contaminants tend to accumulate most heavily on and near the oven floors. Thus, the roof-mounted burner system is more likely to progressively incinerate—and less likely to ignite—the floor accumulation as compared to conventional floor-mounted and wall-mounted burner configurations.

During baking and self-cleaning operations, the flame tube 46 becomes very hot and radiates heat energy throughout the inventive oven 10. It is contemplated that a diffusing tube (not shown) may be employed around the burner for processing food products that tend to discolor or otherwise deteriorate when subjected to intense radiant heat.

The oven 10 has two relatively large blowers 26, 27 (see FIG. 7) to move the heated air created by the burner 44 through the fingers 24 and onto the product so that the most efficient bake is achieved for each food product processed in the oven 10. More specifically, the oven 10 employs collimated, vertical air streams to give uniform and intensive heating. The collimated, vertical streams of air that emerge from the fingers 24 provide an exceptional heat transfer rate and generally bake foods faster and at lower temperatures than in conventional convection hot air or infrared heating ovens.

Figure 9:
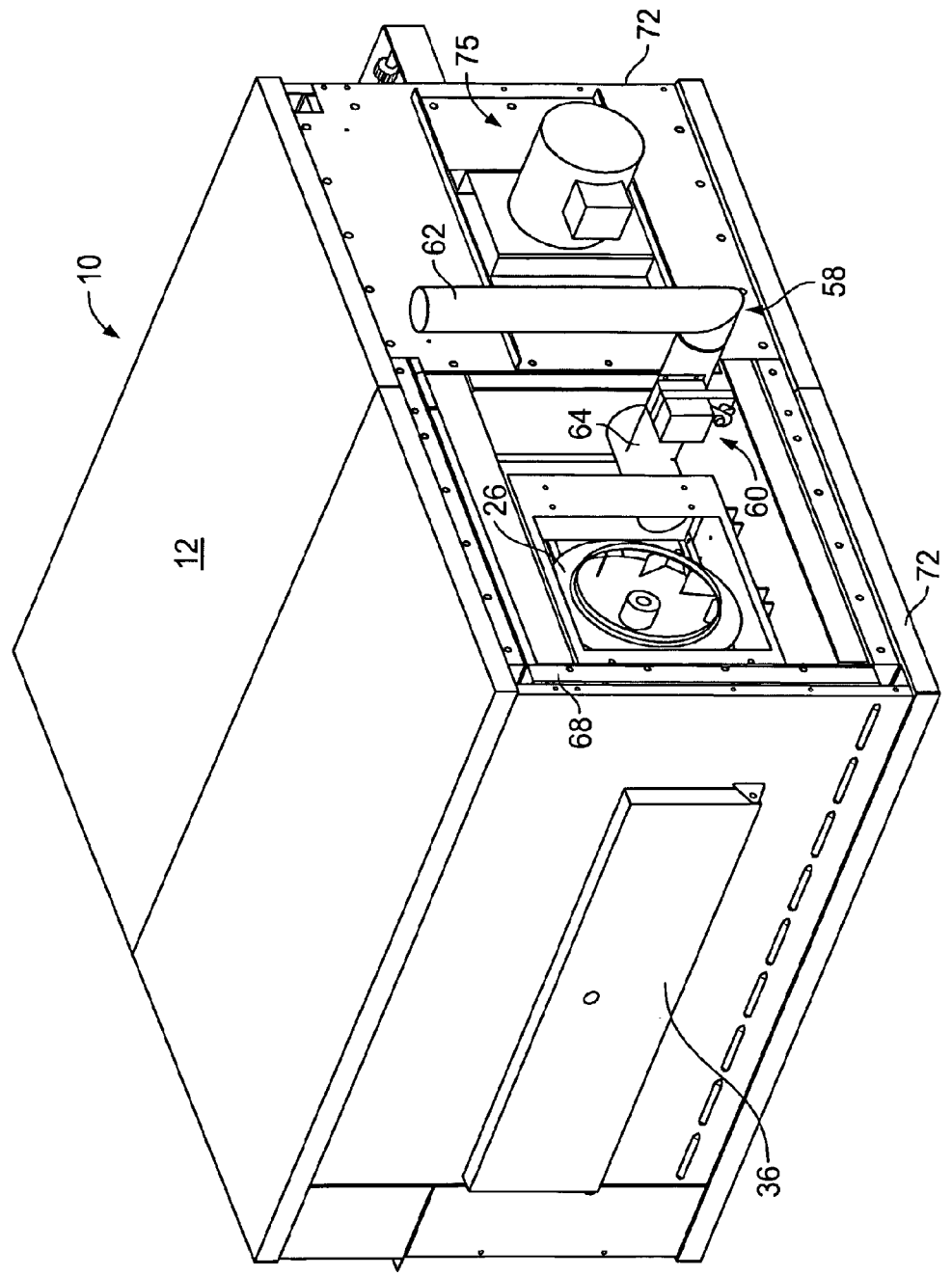
FIG. 9 is a rear perspective view of the oven of FIG. 1 showing the two blowers and the vent arrangement.

The hot air is circulated through the oven 10 by the two blowers 26, 27 located at the back of the oven 10 (see FIG. 9). The two convection blowers 26, 27 are located in the blower housing 74 (see FIG. 10). The blowers 26, 27 are each powered by a blower motor 75 (only one is shown in FIG. 9), which is mounted on the back wall 70, and connected to the blowers 26, 27 by a shaft (not shown). In order to protect the shafts from the pyrolitic temperature of the self-cleaning operation, the shafts may be fitted with heat-slingers (not shown) or other cooling apparatuses. A heat slinger is a type of fan arrangement mounted on the shaft. Each blower motor 75 may be equipped with a dedicated speed controller (not shown), preferably including an electrical power inverter. With the benefit of individual speed control, the blowers 26, 27 can be individually accelerated and decelerated to optimize electrical current inrush, the burner 44 firing or convective heat loss. The speed of the blowers 26, 27 may also be individually controlled in order to create distinguishable heating zones within the oven 10 to optimize the baking of particular food products.

In another embodiment, the blowers 26, 27 may be variable speed blowers that are controlled together so that their speeds, while variable, are always the same as each other.

There are also two cooling fans 13, 15 located on the front of oven 10 as depicted in FIGS. 1, 4, 6, and 7. These fans blow cool air in through the machinery compartment and out the side walls. The cooling fans 13, 15 draw air from the surroundings through the instrument panel 39 for cooling the instruments located behind the instrument panel 39. A portion of the discharge air from the cooling fans 13, 15 may enter the combustion air blower 52 and be delivered to the burner 44 as combustion air. The remainder of the discharge air from cooling fans 13, 15 enters passages that extend between the external sheeting of the oven 10 and an inside wall, which supports insulation. The flow of air in these passages serves to cool the external sheeting of the oven 10 below preferably about 125 degrees F.

Referring to FIG. 9, a vent arrangement 58 is located at the back of the oven 10. The vent arrangement 58 includes a vent valve 60 that is positioned between a vent tube 62 and a T-shaped tube 64 that communicates with the high-pressure sides of the blowers 26. During a normal cooking cycle, the vent valve 60 is closed so that no air passes through the vent valve 60 into the vent tube 62. In this way, during cooking, air that is heated is directed solely into the cooking chamber 16 for efficient cooking of food in the cooking chamber 16. However, when it is desired to clean the oven 10, the vent valve 60 is opened and the oven openings 37, 38 are closed, as discussed above. By opening the vent valve 60, enough heated air is exhausted through the vent tube 62 to maintain a slight negative pressure within the cooking chamber 16. In this way, the smoke and soot that develops during a self-cleaning cycle is exhausted through the vent tube 62 and the passage of smoke and soot through small openings and cracks in the oven housing 12 is prevented.

Figure 10:
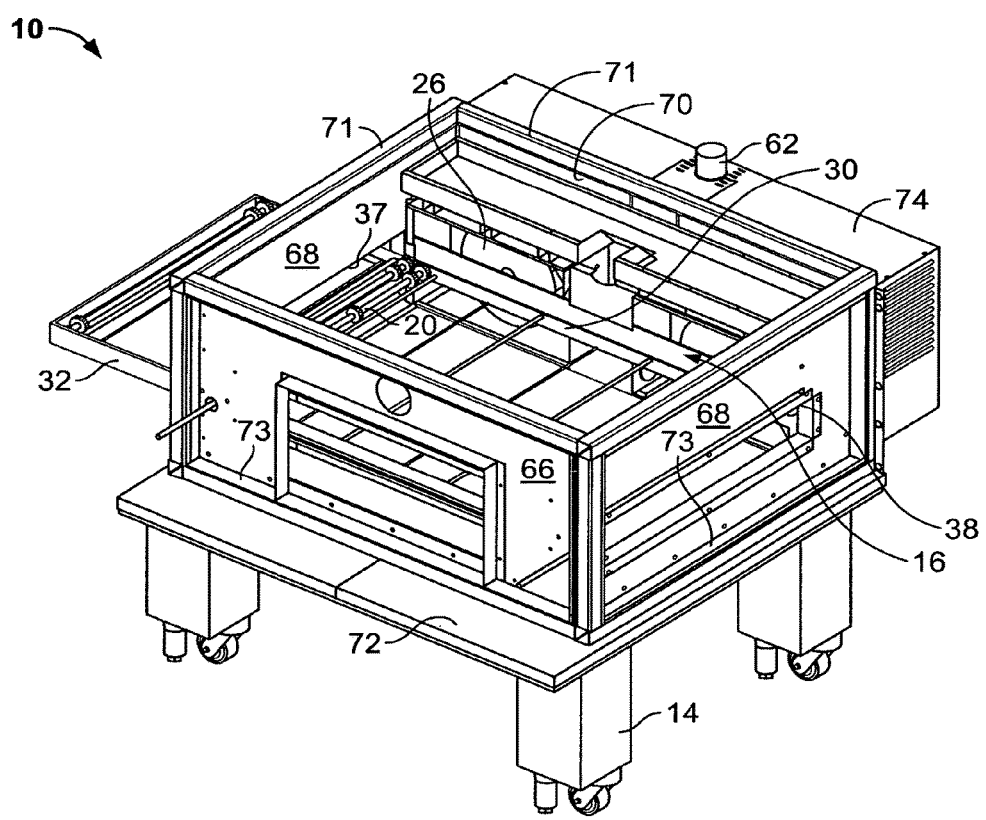
FIG. 10 is a perspective view of walls and a tubular frame support surrounding a cooking chamber of the oven of FIG. 1.

As shown in FIG. 10, the cooking chamber 16 is bounded by a front wall 66 and two side walls 68 that are connected to a back wall 70. The front wall 66, two side walls 68, and back wall 70 are all screwed together to form a box surrounding the cooking chamber 16. The back wall 70 of this box is fixed to a tubular frame 71, which is connected to a platform 72. However, while the back wall 70 of the box is fixed to the tubular frame 71, the front wall 66, and two side walls 68 are free-floating. That is, the front wall 66 and two side walls 68 are connected to the back wall 70, but are not connected to the tubular frame 71. The perimeters of the front wall 66 and the two side walls 68 include lips 73 that sit on the various members that make up the tubular frame 71, but are not fixedly connected to those members. In this way, the front wall 66 and two side walls 68 are free to move relative to the tubular frame 71 so that during cooking, and particularly during self-cleaning when the temperatures in the cooking chamber 16 are relatively high, the front wall 66 and side walls 68 of the cooking chamber 16 are free to expand and slide on the members of the tubular frame 71, thereby preventing buckling and warping of the walls of the cooking chamber 16.

A unified display control station (not shown) for the oven 10 can include a blower selector, a heat selector, a conveyor selector, two or more conveyor speed controllers and a digital temperature controller. Additionally, a machinery compartment access panel safety switch disconnects electrical power to the controls and the blowers when the machinery compartment access panel is opened.

In order to start up the oven 10, an operator confirms that the front access door 40 is closed. The operator then turns the blower and conveyor selectors to the "on" position. If necessary, the operator adjusts the conveyor speed setting by pushing appropriate selectors on the conveyor speed controller. The operator adjusts the temperature controller to a desired temperature and selects normal operation. A heat switch on a control station (not shown) of the oven 10 activates the combustion air blower 52. The burner 44 is a direct ignition burner. The main gas valve 57 is opened while starting a spark in the burner 44. A sensor then monitors whether a flame is present within the burner 44. If a flame is not detected within 6 seconds, the main gas valve 57 is shut down, the burner 44 is purged, and the ignition cycle is repeated. Referring to FIGS. 7 and 8, a gas bypass tube 76 provides enough gas to the burner 44 to maintain a minimum flame even when the gas modulation valve 56 is closed.

The oven 10 will typically heat to a desired heating set-point temperature within a matter of minutes. While the oven 10 is heating, the control station (not shown) displays the actual temperature. One or more thermocouples (not shown) in the interior of the oven 10 send signals to a programmable controller (not shown) that controls the actuator 48. If the programmable controller (not shown) calls for more heat, the actuator 48 rotates to open the air valve 50 and more combustion air is permitted to pass from the combustion air blower 52 to the burner 44. Simultaneously, the valve link 54 moves under the influence of the actuator 48 to further open the gas valve 56, permitting more heating gas to pass from gas line 55 to the burner 44. If the programmable controller (not shown) calls for less heat, the valve link 54 causes the air valve 50 and the gas valve 56 to close simultaneously and proportionally. Consequently, the ratio of combustion air flow to heating gas flow entering the burner 44 remains approximately constant over a range of heat output.

As mentioned, the speed of the blowers 26, 27 can be varied. For example, the speed of the blowers may be two-thirds full speed during start-up and self-cleaning cycles and full speed during a cooking cycle to promote heating efficiency during each of the cycles. For heating the oven 10 to baking or self-cleaning temperatures, one or both of the blower motors 75 (only one is shown in FIG. 9) start and routinely ramp up to a desired operating speed in a programmable period of time. Programming the start-up time of convection blower motors 75 makes firing of the burner 44 more reliable and promotes better combustion, among other things. When the blowers 26, 27 are turning, the burner 44 is initially fired with a minimum heat output and ramped up to the baking or self-cleaning heat output over a period of time by, for example, a programmable controller (not shown). When the desired heat output has been achieved, the blower motors 75 are accelerated to operating speed in a programmable period of time.

The start-up procedure (i.e., ramping up the speed of one or both of the blowers 26, 27) prevents an objectionable current inrush situation that is observed in conventional ovens, which commonly start two or more blower motors at full speed simultaneously. This startup procedure is also quieter, and requires less electricity and heating gas, than the startup of conventional ovens. Because the blowers 26, 27 draw more electrical current when the oven is cold and the air in the oven is relatively dense, operating both blowers at low speed during heat-up (start-up) saves electricity. Also, because increased convection on the inside surfaces of the oven walls promotes heat loss to the kitchen, operating only one of the convection blowers during heat-up saves heating gas.

Preferably, each of the blowers 26, 27 is equipped with an electrical power inverter (not shown), which alters the frequency and/or voltage of the electrical current to control the speed of the blower 26 or 27. In that case, the blower motor 75 can be either ramped up to operating speed over a programmable period such as, for example, about thirty minutes, or held at an optimal intermediate speed until the oven 10 reaches baking or cleaning temperature and then accelerated. These variations conserve still more energy by providing appropriate programmable blower speeds depending on the current operation of the oven 10. When the oven 10 is, for example, baking (cooking), self-cleaning, warming up, or cooling down, the blowers 26, 27 can operate at specific speeds best suited for each individual activity.

Furthermore, for baking, the speed of the blower motors 75 (only one is shown in FIG. 9) may be separately adjusted to create two or more different heating zones (not shown) within the oven 10. These heating zones (not shown) can be created at will and utilized to optimize the baking process and, consequently, the finished quality of a particular food product. The oven 10 may be equipped with two or more thermocouples (not shown) or other temperature sensors to individually monitor and adjust these heating zones (not shown). The manner in which the signals from these thermocouples (not shown) are averaged or otherwise interpreted by the programmable controller can be varied to suit the food product.

In order to shut down the blowers 26, 27, the operator selects standby on the control station. The blowers 26, 27 will remain in operation until the oven 10 has cooled to below 200 degrees F. and then cease turning.

When it is determined that the oven 10 should be cleaned, it is cooled to a temperature below about 140 degrees F. The operator then disengages the first conveyor extension section 32 and withdraws the first conveyor extension section 32 from the first oven opening 37. The first conveyor extension section 32 is then inserted into the first oven opening 37 so that the first conveyor extension section 32 is supported by the main conveyor section 30 and the first insulated door 35 closes the first oven opening 37. The second conveyor extension section 34 is similarly separated from the oven 10 and inserted into the second oven opening 38 and the second insulated door 36 is closed. Because the first and second conveyor extension sections 32, 34 are inserted into the interior of the oven 10, they are cleaned by pyrolitic heat during the self-cleaning cycle. The vent valve 60 (best seen in FIG. 9) is opened and the blowers 26, 27 are then brought up to operating speed and the burner 44 is fired to raise the oven 10 to self-cleaning temperature. During the self-cleaning cycle, oven 10 operates under the control of temperature sensors and controllers (not shown) that are specifically designed to operate in the range of about 650-1000 degrees F. These may be the same sensors and controllers used for baking (not shown) or a separate set.

In either case, the programmable control system actuates a set of safety interlocks adapted for cleaning temperature operation. For example, the oven overrides the baking cycle high temperature shutdown limits, which are typically set at values less than 600 degrees F. As another example, the programmable control system actuates door locks that deter people from opening the oven doors during the pyrolitic self-cleaning cycle.

The programmable controller also initiates corrective action if unsafe or undesirable conditions are detected. For example, upon detecting excessively high temperatures, high smoke levels or low oxygen levels within the oven, the programmable controller shuts down the burner 44 and the blowers 26, 27.

As mentioned, during cleaning, the interior of the oven 10 is kept under a negative pressure compared to the surrounding atmospheric pressure. In the illustrated embodiment the opening of the vent valve 60 and the operation of the blowers 26, 27 create the negative pressure in the interior of the oven 10. As mentioned earlier, when the vent valve 60 is opened and the blowers 26, 27 are operating, enough circulating hot air escapes through the vent valve 60 to create the negative pressure inside the cooking chamber 16 necessary to force the smoke and soot created during the cleaning cycle through the vent tube 62. In another embodiment, an inducer blower (not shown) maintains the interior of the oven 10 under a negative pressure during cleaning as compared to the surrounding atmospheric pressure. The inducer blower creates this negative pressure by drawing air from the blower housing 74. The blowers 26, 27 actually assist the inducer blower in creating this negative pressure because the discharge flow from the blowers 26, 27 is impelled directly into the inducer blower. The combined effect is similar to that of a two-stage blower. The discharge flow from the inducer blower is sent to the vent arrangement 58.

The inducer blower could also take suction from the interior of the oven 10 during normal baking. The entry of the inducer blower opens directly into the blower housing 74. The inducer blower may be positioned directly in the path of the discharge air flow from each of the blowers 26, 27 so that the two sets of blowers work in tandem to reduce the pressure in the interior of the oven 10. Alternatively, the inducer blower may be mounted anywhere in the interior of the oven 10. The discharge flow of air from the inducer blower is sent to the vent arrangement 58 for disposal.

Maintaining negative pressure in the interior of the oven 10 during both cooking and self-cleaning enhances energy efficiency and safety. Maintaining negative pressure in the interior of the oven 10 during the cooking and self-cleaning operations insures that little or no heated air escapes to the kitchen. Minimizing heated air loss makes the oven 10 more energy efficient. Any loss or discharge of heated air from the interior of the oven 10 necessitates the combustion of additional heating gas. By directing all exhaust flows from the oven 10 to the vent arrangement 58 and ultimately the vent tube 62, the loss or discharge of heated air can be better controlled and minimized. Also, the negative pressure system promotes safety because negative pressure retains burning gases in the interior of the oven 10 rather than permitting them to escape into the kitchen. Additionally, maintaining negative pressure in the oven 10 tends to prevent any smoky residue from building up on the exterior of the oven 10 during normal cooking and self-cleaning operations. The exterior surfaces of the oven 10 remain clean longer because they are not subjected to smoke, which commonly escapes from the atmospheric cooking chambers of conventional ovens.

The blowers 26, 27 turn at a relatively low speed during a first incineration period of the cleaning cycle. This low speed uniformly distributes heat throughout the interior of the oven 10 while minimizing convective heat loss through the walls of the oven 10. The first incineration period generally continues for about one hour, although it may be longer or shorter based on factors such as the cleaning temperature and the amount and type of contamination in the oven 10.

During a second incineration period, which is generally about one to three hours in duration, the blowers 26, 27 operate at a relatively higher speed to promote complete incineration of the contamination or debris accumulation. The temperature of the oven 10 is increased to a peak temperature at least once during the second incineration period.

After the incineration periods, the programmable controller cools the oven, disengages the safety interlocks and arranges the control system for cooking operation. Due to the combination of high temperature and convective air flow in the inventive oven during the self-cleaning cycle, any contamination accumulation that is in the oven is reduced to harmless and sterile ash. This ash may be collected on drip pans provided for that purpose, which can be accessed through the front access door 40 and carried away to disposal. Alternatively, the ash may be collected in a vacuum cleaner system that is built into or independent of the inventive oven.

It is contemplated that collection of the ash from the lower fingers may be facilitated by constructing the mesh belt 102 of the main conveyor section 30 so that it is close to or touching the perforated plates of the lower fingers 24. The mesh belt 102 thus pushes or scrapes the ash from the lower fingers 24 for collection by a drip pan or vacuum system. Preferably, the perforations are formed so that the lower fingers 24 present a nonabrasive surface to the mesh belt 102.

Although the invention has been described in detail with reference to certain preferred embodiments, variations and modifications exist within the scope and spirit of the invention as described and defined in the following claims.

What is claimed is:

1. A conveyor oven comprising:
an oven chamber in which food is cooked;
a conveyor moveable to convey the food through the oven chamber;
a finger positioned within the oven chamber and including a nozzle generally directed toward the conveyor;
a burner to generate a heat output, the burner having a combustion airflow rate generated at least in part by a combustion blower and having a variable heat output;
at least one air-circulating blower configured to direct impingement air heated by the burner through the nozzle of the finger to cook food positioned within the oven chamber, wherein the at least one air-circulating blower operates at variable positive air-circulating speeds;
a temperature sensor within the oven that generates temperature signals indicative of the temperature of air circulating within the oven, heated by the burner, and directed through the finger and nozzle to impinge upon food product upon the conveyor; and
a controller that
receives the temperature signals generated by the temperature sensor, and
in response to the received temperature signals indicating an increase in the temperature of cooking air used to impinge upon and cook the food product, is configured to set the air-circulating speed of the at least one air-circulating blower from a first positive air-circulating speed to a second faster positive air-circulating speed to maintain a continuous positive air circulation in the oven chamber, wherein the controller increases the air-circulating speed of the at least one air-circulating blower over a predetermined period of time.

2. The conveyor oven of claim 1, wherein the burner has a gas flow rate that is increased from a first flow rate to a second flow rate based at least in part on the received temperature signals indicating a need for more heat output from the burner.

3. The conveyor oven of claim 1, wherein the combustion blower airflow rate is increased from a first positive airflow rate to a second positive airflow rate in response to the received temperature signals indicating a need for more heat output from the burner.

4. The conveyor oven of claim 1, further comprising a valve to adjust the combustion blower airflow rate.

5. The conveyor oven of claim 1, wherein the burner has a gas flow rate that is adjusted between at least two positive flow rates based in part in response to the received temperature signals indicating a change in oven temperature.

6. The conveyor oven of claim 5, wherein the controller adjusts the combustion blower airflow rate and the gas flow rate to maintain a substantially constant ratio between the combustion blower airflow rate and the gas flow rate over a range of operation.

7. The conveyor oven of claim 1, wherein the at least one air-circulating blower is a first air-circulating blower, the conveyor oven further comprising a second air-circulating blower, and wherein the first air-circulating blower and the second air-circulating blower are separately adjustable to create two different heating zones in the oven chamber.

8. The conveyor oven of claim 7, wherein the oven is equipped with two or more temperature sensors to individually monitor and adjust the two different heating zones.

9. The conveyor oven of claim 7, wherein during the predetermined period of time the air-circulating speed of only one air-circulating blower of the first and second air-circulating blowers is set from the first air-positive air circulating speed to the faster second positive air-circulating speed.

10. The conveyor oven of claim 1, wherein the at least one air-circulating blower is a first air-circulating blower, the conveyor oven further comprising a second air-circulating blower, and wherein during the predetermined period of time the air-circulating speeds of both the first and second air-circulating blowers are set from the first positive air-circulating speed to the faster second positive air-circulating speed.

11. The conveyor oven of claim 1, wherein the predetermined period of time is an oven start-up mode.

12. The conveyor oven of claim 1, wherein the air-circulating speed of the at least one air-circulating blower is set from the first positive air-circulating speed to the faster second positive air-circulating speed after a desired heat output or oven temperature has been achieved.

13. The conveyor oven of claim 1, further comprising a mode of operation in which the at least one air-circulating blower is shut down.

14. The conveyor oven of claim 13, wherein the at least one air-circulating blower is not shut down until the oven temperature drops below a threshold temperature.

15. The conveyor oven of claim 1, wherein the at least one air-circulating blower operates at the first positive air-circulating speed in a self-cleaning mode of the oven.

16. The conveyor oven of claim 1, wherein the combustion blower generates a combustion blower airflow rate that is decreased from a first positive airflow rate to a second positive airflow rate in response to the received temperature signals indicating a need for less heat output from the burner.

17. The conveyor oven of claim 1, wherein the oven is equipped with two or more temperature sensors, and the controller is configured to vary the interpretation of the temperature signals received from the two or more temperature sensors to suit the food product.

18. The conveyor oven of claim 1, further comprising a valve to adjust a burner gas flow rate and a valve to adjust an airflow rate of the combustion blower, both of which are operable to maintain substantially constant amount of excess air in the burner during high and low heating load periods.

19. A conveyor oven comprising:
an oven chamber in which food is cooked;
a conveyor moveable to convey the food through the oven chamber;
at least two fingers each positioned within the oven chamber and including a nozzle generally directed toward the conveyor;
a burner to generate a heat output, the burner having a combustion airflow rate generated at least in part by a combustion blower and having a variable heat output;
a first air-circulating blower configured to direct impingement air heated by the burner through the nozzle of a first finger of the at least two fingers to cook food positioned within the oven chamber and a second air-circulating blower configured to direct impingement air heated by the burner through the nozzle of a second finger of the at least two fingers to cook food positioned within the oven chamber, wherein each of the first and second air-circulating blowers operates at variable positive air-circulating speeds;
a temperature sensor within the oven that generates temperature signals indicative of the temperature of air circulating within the oven, heated by the burner, and directed through the finger and nozzle to impinge upon food product upon the conveyor; and
a controller that
receives the temperature signals generated by the temperature sensor, and
in response to the received temperature signals indicating an increase in the temperature of cooking air used to impinge upon and cook the food product, is configured to set the air-circulating speed of at least one of the first and second air-circulating blowers from a first positive air-circulating speed to a second faster positive air-circulating speed to maintain a continuous positive air circulation in the oven chamber, wherein the controller increases the air-circulating speed of at least one of the first and second air-circulating blowers over a predetermined period of time.

20. The conveyor oven of claim 19, wherein the first air-circulating blower and the second air-circulating blower are separately adjustable to create two different heating zones in the oven chamber.

* * * * *